(12) United States Patent
Brueckner et al.

(10) Patent No.: US 7,415,313 B2
(45) Date of Patent: Aug. 19, 2008

(54) SPATIAL COORDINATION SYSTEM

(75) Inventors: Sven Brueckner, Ann Arbor, MI (US); Henry Van Dyke Parunak, Ann Arbor, MI (US); John A. Sauter, Ann Arbor, MI (US)

(73) Assignee: New Vectors LLC, Ann Arbor, MI (US)

( * ) Notice: Subject to any disclaimer, the term of this patent is extended or adjusted under 35 U.S.C. 154(b) by 1198 days.

(21) Appl. No.: 09/900,251

(22) Filed: Jul. 6, 2001

(65) Prior Publication Data

US 2002/0069018 A1   Jun. 6, 2002

Related U.S. Application Data

(60) Provisional application No. 60/216,805, filed on Jul. 7, 2000.

(51) Int. Cl.
*G05B 19/18* (2006.01)
*G05B 13/02* (2006.01)
*G05B 15/00* (2006.01)
*G06E 1/00* (2006.01)
*G06E 3/00* (2006.01)

(52) U.S. Cl. .............................. 700/56; 700/1; 700/19; 700/64; 700/47; 422/105; 422/107; 422/108; 706/10; 706/14; 706/15; 706/45

(58) Field of Classification Search .................... 700/1, 700/19, 56, 64, 47; 422/105, 107, 108, 83; 706/10, 14, 15, 45
See application file for complete search history.

(56) References Cited

U.S. PATENT DOCUMENTS

| | | | | |
|---|---|---|---|---|
| 5,443,354 A | * | 8/1995 | Stone et al. | 414/729 |
| 5,465,525 A | * | 11/1995 | Mifune et al. | 43/132.1 |
| 5,528,049 A | | 6/1996 | Callahan | 250/493.1 |
| 5,825,981 A | * | 10/1998 | Matsuda | 700/248 |
| 5,898,004 A | | 4/1999 | Asher et al. | 436/518 |
| 6,377,878 B1 | * | 4/2002 | Feddema et al. | 701/27 |
| 6,681,150 B1 | * | 1/2004 | Haga et al. | 700/245 |

OTHER PUBLICATIONS

P. Kuntz, P. Layzell, "An Ant Clustering Algorithm Applied to Partionning in VLSI Technology", MIT Press, 1997.
P. N. Kugler, R. E. Shaw, K. J. Vincente, J. Kingsella-Shaw, "Inquiry into intentional systems I: Issues in ecological physics", Psychological Research, Springer-Verlag, Heidelberg, Germany, 1990.
E. Bonoabeau, G. Theraulaz, "Swarm Smarts", Scientific American, Mar. 2000, pp. 73-79.
E. Bonoabeau, M. Dorigo, G. Theraulaz, "Inspiration for optimization from social insect behaviour", Nature, vol. 406, Jul. 6, 2000, pp. 39-42.

(Continued)

*Primary Examiner*—Brian Sines
(74) *Attorney, Agent, or Firm*—Gifford, Krass, Sprinkle, Anderson & Citkowski, PC

(57) ABSTRACT

A system and process uses pheromone propagation to provide direction and/or distance information to a remote destination through the use of localized decision making processes. Locally available information is exchanged and translated with global information through the use of a pheromone vocabulary and multi-layer grid systems. Self-organizing networks of sensors provide remote monitoring of a space.

40 Claims, 15 Drawing Sheets

Pump Population

OTHER PUBLICATIONS

M. Dorigo, G. Di Caro, L. M. Gambardealla, "Ant Algorithms for Discrete Optimization", Technical Report—IRIDIA, 10-98 Universite Libre de Bruxelles, Belgium.

A. Colorni, M. Dorigo, V. Maniezzo, M. Trubian, "Ant system for Job-shop scheduling", Belgian Journal of Operations Research, Statistics and Computer Scients, vol. 34(1), pp. 39-53, 1994.

M. Heusse, S. Guerin, D. Snyers, P. Kuntz, "A New Distributed and Adaptive Approach to Routing and Load Balancing in Dynamic Communication Networks", Technical Report RR-98001-IASC, Department Intelligence Artificelle et Sciences Cognitives, ENST Poretagne, 1998. Accepted for publication in the Journal of Complex Systems.

G. Di Caro, M. Dorigo, "AntNet: Distributed Stigmergetic Control for Communications Networks", Journal of Artificial Intelligence Research 9, pp. 317-365, Dec. 1998.

T. Stutzle, M. Dorigo, "ACO Algorithms for the Traveling Salesman Problem", Evolutionary Algorithms in Engineering and Computer Science: Recent Advances in Genetic Algorithms, Evolution Strategies, Evolutionary Programming, Genetic Programming and Industrial Applications, 1999.

D. Helbing, F. Schweitzer, J. Keltsch, P. Molnar, "Active Walker Model for the Formation of Human and Animal Trail Systems", no date.

L. Steels, "Cooperation Between Distributed Agents Through Self-Organisation", presented at the Lagos Workshop on Autonomous Agents, Nov. 1988; accepted for publication in Journal on Robotics and Autonomous Systems, North Holland Amsterdam, 1989.

S. Aron, J. J. Denebourg, S. Goss, J. M. Pasteels, "Functional Self-Organisation Illustrated by Inter-Net Traffic in the Argentine Ant 'Iridomyrmex Humilis'", Biological Motion, no date.

S. Goss, S. Aron, J. J. Deneubourg, J. M. Pasteels, "Self-organized Shortcuts in the Argentine Ant", Naturwissenschaften 76, pp. 579-181, 1989.

E. Bonabeau, F. Henaux, S. Guerin, D. Snyers, P. Kuntz, G. Theraulaz, "Routing in telecommunications networks with "smart" ant-like agents". In Proceedings of IATA '98, Second Int. Workshop on Intelligent Agents for Tellecommunication on Applications. Lecture Notes in AI vol. 1437, Springer Verlag, 1998.

M. Heusse, D. Snyers, S. Guerin P. Kuntz, "Adaptive Agent-Driven Routing and Load Balancing in Communication Networks", ENST de Bretagne Technical Report RR-98001-IASC.

L. M. Gambardella, M. Dorigo, "HAS-SOP: Hybried Ant System for the Sequential Ordering Problem", Technical Report 11-97, IDSIA, Lugano, CH, 1997.

T. Stutzle, M. Dorigo, "ACO Algorithms for the Quadratic Assignment Problem", Technical Report, IRIDIA 2-99, Universite Libre de Bruxelles, BG.

V. Maniezzo, A. Colorni, M. Dorigo, "The Ant System Applied to the Quadratic Assignment Problem". IEEE Trans. Knowledge and Data Engineering, 1999, in press.

A. Colorni, M. Dorigo, V. Maniezzo, "Distributed Optimization by Ant Colonies", appeared in Proceedings of ECAL91-European Conference on Artificial Life, Paris, France, pp. 134-142, Elsevier Publishing.

M. Dorigo, V. Maniezzo, A. Colorni, "The Ant System: Optimization by a colony of cooperating agents", IEEE Transactions on Systems, Man, and Cybernetics, B 6, 29-41 (1996).

"New Ideas in Optimization", Chapter 2, "The Ant Colony Optimization Meta-Heuristic", M. Dorigo, G. Di Caro, pp. 11-32; Chapter 3, "ACO Algorithms for the Quadratic Assignment Problem", T. Stutzle, M. Dorigo, pp. 33-50; Chapter 4, "An ACO Algorithm for the Shortest Common Supersequence Problem", R. Michael, M. Middledorf, pp. 51-61; Chapter 5, MACS-VRPTW: A Multiple Ant Colony System for Vehicle Routing Problems with Time Windows, L. M. Gambardella, E. Taillard, G. Agazzi, pp. 62-76.

E. Bonabeau, M. Dorigo, G. Theraulaz, "Swarm Intelligence—From Natural to Artificial Systems", Chapter 2, "Ant Foraging Behavior, Combinatorial Optimization, and Routing in Communications Networks", (Oxford University Press, New York, 1999).

H. Van Dyke Parunak, "Go to the Ant: Engineering Principles from Natural Multi-Agent Systems," Annals of Operations Research 75 (1997) 69-101, Mar. 5, 2001.

H. Dieter Burkhard, Kurt Sundermeyer, H. Van Dyke Parunak, "Return from the Ant, Synthetic Ecosystems for Manufacturing Control," Dissertation, Jan. 2000.

* cited by examiner

SPATIAL COORDINATION SYSTEM

REFERENCE TO RELATED APPLICATIONS

This application claims priority of provisional application 60/216,805 filed Jul. 7, 2000, which is incorporated herein by reference.

FIELD OF THE INVENTION

The present invention relates to a system for coordinating the actions of individual agents situated in an environment with the environment and with one another, and more particularly to a system operating with pheromone robotics.

BACKGROUND OF THE INVENTION

The synthetic ecosystems approach applies basic principles of natural agent systems to the design of artificial multi-agent systems. H. V. D. Parunak. 'Go to the Ant': Engineering Principles from Natural Agent Systems. Annals of Operations Research, 1997; E. Bonabeau, M. Dorigo, and G. Theraulaz. Swarm Intelligence: From Natural to Artificial Systems. Santa Fe Institute Studies in the Sciences of Complexity. Oxford University Press, 1999. Natural agent systems, like social insect colonies or market economies, express system-level features that make them interesting blueprints for industrial applications. Made up of a large number of simple, locally interacting individuals, these systems are flexible to changing conditions, robust to component failure, scalable in size, adaptive to new environments, and intuitive in their structure. In natural agent systems, large numbers of individuals coordinate their activities in the fulfillment of tasks in stigmergetic interactions through the environment. P. -P. Grasse. La reconstruction du nid et les coordinations inter-individuelles chez bellicositermes natalensis et cubitermes sp. la theorie de la stigmergy: Essai d'interpretation du comportement des termites constructeurs. Insectes Sociaux, 6:41-80, 1959.

Problems associated with applying the concept of natural agent systems to create viable synthetic ecosystems have included determining a pheromone infrastructure necessary for a sensor operating in the system area to determine the spatial structure of the environment, sensor location, pheromone source location, and communicate such information with other sensors and/or system components tasked with locating synthetic pheromone sources.

SUMMARY OF THE INVENTION

A global guidance system is provided that yields direction and/or distance to a destination that is often remote from a decision maker based upon a localized decision making process. Information is translated between global and local forms and represented in a manner accessible to a decision maker.

A multi-pheromone vocabulary is detailed in which each class of target emits several pheromones with different configurations of propagation rate, threshold and evaporation rate. In the preferred embodiment, a "pheromone" is a packet of digital information that includes at a minimum two pieces of information: a type identifier enabling different packets of the same type to be associated with one another, and a strength. It will be apparent to one skilled in the art that non-digital embodiments, such as chemical deposits with distinguishable composition (corresponding to the type) and concentration (corresponding to the strength), are also possible and fall within the purview of the invention. The different pheromone configurations emitted by each target provide a gradient between long range detection and short range accuracy of guidance. A protocol is provided herein to determine the optimal set of pheromone configurations for a given problem as well as a method of local information content estimation such that a decision maker may decide which pheromone signal should guide target seeking behavior at any given time.

A structural knowledge of the inventive infrastructure is used to provide an explicit representation of the distance of a given point from a specific target. Unlike traditional pheromone systems that generate distance information by uniformly propagating pheromones between locations, a method is detailed to generate this information by sending software agents through a network of locations. This methodology ensures efficient sampling of a spatial network through the use of state history for a given sensor to compute current distance from a target at any given location and to make copies of the distance agents to ensure that each point has a resident distance agent refreshing the concentration of the distance pheromone.

Through the combination of a multi-pheromone vocabulary and distance information of a given point, a hierarchical representation of space is provided that deconstructs a system operational area into smaller areas having optionally varying grid meshes. A pheromone can propagate from a target at multiple levels of the hierarchical space representation. The difference in the number of grid mesh areas between a target and a decision maker affords an alternate target guidance system for a decision maker.

A dynamic self-organizing network of locations is provided that supports hierarchical, multi-pheromone and distance determining algorithms. Individual point locations may be added or removed during the course of operation, or an individual point location may deliberately be reassigned to increase coverage of a spatial region based upon the density of targets being sought and the number of agents being directed thereto. The resulting network is capable of dynamic self organization and real time accommodation of network variations.

These concepts are extended to use only local interaction between a spatially distributed collection of sensors to create a distributed potential field that is then used to direct the global flow of information through the system. Through each sensor triangulating its position within the potential field, approximation of the absolute geographic location of each sensor entity is provided.

DETAILED DESCRIPTION OF THE PREFERRED EMBODIMENTS

Figure 1:
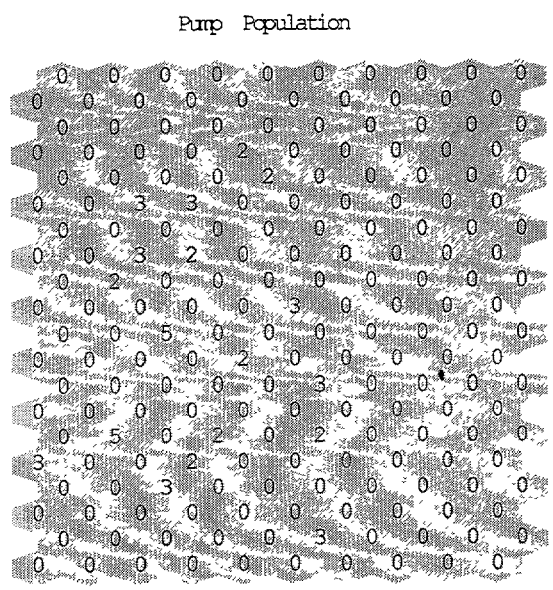
FIG. 1 is a distribution of fifty pheromone pumps randomly across the western part of a 10×10 hexagonal grid.

The present invention has utility as a communication system relating to the location of targets within a space using simple system components. Utility is found in solving complex coordination problems associated with tasking of air-combats to a population of air-defense or ground troop agents, traffic coordination, macro-economic modeling, sociological research, consumer behavior and manufacturing control, among others.

The pheromone infrastructure, detailed in S. Brueckner. *Return from the Ant: Synthetic Ecosystems for Manufacturing Control*. Dr.rer.nat. Thesis at Humboldt University Berlin, Department of Computer Science, 2000, enhances the execution infrastructure of the inventive software agents, providing the agents with an active environment where they may share information. The pheromone infrastructure introduces a spatial structure to the system in which the agents may deposit synthetic pheromones at discrete point locations (places) and perceive concentrations of such pheromones.

The internal operation of the pheromone infrastructure aggregates and propagates pheromone deposits by the agents. At the same time, local pheromone concentrations are reduced in strength automatically by the pheromone infrastructure's evaporation mechanism. There are three general parameters specifying a pheromone in the infrastructure: the pheromone's evaporation factor, propagation factor, and threshold. The evaporation factor determines the rate of the decay of the local strength of a pheromone over time. The propagation factor influences the strength with which a pheromone deposit event to a place is propagated to the neighboring places. The threshold is the strength below which the pheromone is ignored by the pheromone infrastructure. The performance of a pheromone-based coordination mechanism in a specific application depends on these three parameters.

The present invention details a pheromone-based coordination mechanism of agents on a hexagonal grid. Agents of two species live in places on the grid: pumps and walkers. Pumps regularly deposit pheromones at their current place. Potentially, they are able to move independently over the grid, but in this paper, we consider static pumps only. The walkers seek to occupy the same places as the pumps, but do not perceive them directly or know the purpose of their movements. Walkers are only permitted to sample pheromone concentrations at their current place and their immediate neighbors. They may not even communicate directly among themselves.

Walking on Pheromones

A pheromone system embodies two sets of dynamics: those of the pheromones themselves, and those of the walkers, which move in response to the pheromones.

Consider a stationary pump that deposits a fixed amount A of a pheromone at a fixed rate of one deposit every T unit time. The long-term behavior of the resulting pheromone field surrounding the pump depends on three parameters: the evaporation factor, the propagation factor, and the threshold of the pheromone.

Evaporation and propagation are inspired directly by physical processes in the real world, where they both result from Brownian movement of pheromone molecules. Evaporation models the removal of molecules from a place by Brownian motion. Some molecules settle on nearby ground where they may be sensed by ants. The propagation of deposit events in the pheromone infrastructure reflects this process.

Unlike evaporation and propagation, the threshold is a concession to the exigencies of a computational model. Physical processes in nature have no problem in bouncing a pheromone molecule anywhere on earth from its point of original deposit, but the passage of a pheromone from one place to another is modeling herein as a message in an object-oriented program, and the volume of messages would explode if we continued to pass pheromones whose strengths have decayed so far that they have no further practical effect. So, when a place receives a pheromone deposit below the threshold, it changes the local pheromone concentration, but does not propagate it farther.

If a place propagates a pheromone deposit to its direct neighbors, it determines the new deposit strength for each neighbor as the product of the original deposit strength and the propagation factor divided by the overall number of direct neighbors. The strength of a deposit weakens with every propagation step, because the propagation factor is required to be smaller than one.

A deposit at a place changes the local concentration of the pheromone by the strength of the deposit. Without any deposits, the local concentration of the pheromone is continuously reduced over time. The remaining concentration after one unit time is the product of the previous concentration and the evaporation factor of the pheromone.

A more detailed discussion of the pheromone dynamics in the generic pheromone infrastructure is presented in S. Brueckner. *Return from the Ant: Synthetic Ecosystems for Manufacturing Control.* Dr.rer.nat. Thesis at Humboldt University Berlin, Department of Computer Science, 2000.

All walkers move on a grid of polygons (more generally, polytopes) in discrete steps. While the following details a hexagonal grid system, it is appreciated that a variety of space filling grid systems are operative herein. Alternate grid systems illustratively include trigonal and quadragonal, or in the case of higher dimension spaces, three-dimensional analogs thereto that are space filling are recognized to be operative herein. Three-dimensional grid systems illustratively include tetragonal, cuboidal, cubo-octahedral and icosahedral. In principle, the grid need not be restricted regular polygons or regular polyhedra, but may be defined by a series of points scattered throughout the space to be covered, each such point associated with a polytope within which it lies. Such regions may be defined unambiguously in a number of ways, such as the Voronoi diagram defined from the Delaunay triangulation based on the points. At a relocation moment t and located at an arbitrary place p, a walker selects its next location probabilistically from the set (C(p)) of currently available options. C(p) includes the current place p and all of p's direct neighbors. On the hexagonal grid away from the outside borders, a walker always has seven places (C(p)=$p_1, \ldots, p_7$) from which to choose. The following discussion assumes that the grid is sufficiently large to ignore the special case of places located at the grid's border.

The walker determines the selection probability of the places in two steps. First, it samples the concentration of the pheromone ($s_i$) at each place ($p_i$). In the second step, the walker determines the relative attraction ($f_i$) of a place as its local pheromone concentration normalized by the overall concentration of all places $$\left( f_i = s_i \bigg/ \sum_{p_j \in C(p)} s_j \right).$$

As a result, the walker has assigned each place a number between zero and one, which add up to one across all seven places. The relative attraction is the probability of a place to be selected. The walker chooses its next place using a roulette wheel weighted according to these probabilities. The local guidance at place p available to the walker is $$g(p) = \underset{p_i \in C(p)}{\text{Max}} (f_1) - 1/|C(p)|,$$

and ranges from 0 (if the pheromone has the same strength in all seven places) to $1-1/|C(p)|$ (if only one place has a pheromone concentration larger than zero).

The pheromone-biased selection mechanism realizes a probabilistic climbing of the spatial gradient of the pheromone field. The stronger the gradient of the pheromone concentration is, the higher is the probability of the walker to follow the gradient. It is appreciated that a walker can be programmed to not only co-locate with a pump, but also to obtain a preselected pheromone concentration corresponding to a finite distance from a pump or even repulsion from the pheromone gradient, as in the case of a toxin. Thus, in a non-co-location mode, the present invention has utility in determining safe evacuation routes in the event of a toxin release.

The problems associated with a single pheromone emitting pump are provided as models to illustrate the improvements made thereover by the present invention. Referring now to FIG. 1, a distribution of fifty pump sources, each emitting single pheromones, are distributed randomly in the western part of a 10×10 hexagonal grid.

Figure 2:
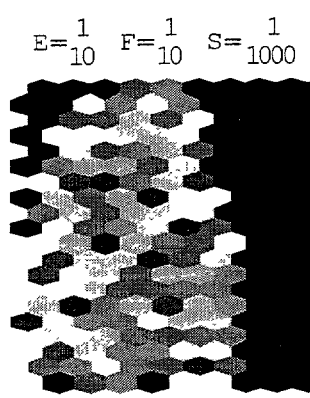
FIG. 2 shows a contour plot of the local guidance over the grid of FIG. 1 when the pumps generate pheromone deposits with an evaporation factor $E=\frac{1}{10}$ and a propagation factor $F=\frac{1}{10}$.

A contour plot of local guidance over the grid of FIG. 1 when the pumps generate pheromone deposits with an evaporation factor E=$\frac{1}{10}$ and a propagation factor F=$\frac{1}{10}$ is shown in FIG. 2. The guidance is zero along the eastern portion of the grid, representing a wide valley across which the pheromone cannot propagate and in which walkers receive no guidance. In the western portion of the grid, where the pumps are located, the guidance is highly variable and frequently becomes quite high. If a walker in this region senses low guidance, a short random walk will bring it to a place with high guidance. Thus in this configuration, walkers have difficulty finding a target-rich area, but once within it, can home in quickly on individual targets.

Figure 3:
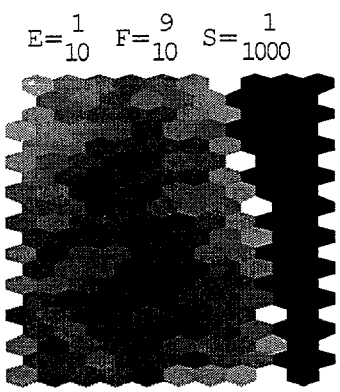
FIG. 3 is a contour plot as in FIG. 2 except for a propagation factor $F=\frac{9}{10}$.

This does not substantially change with E. However, it is quite sensitive to F, as FIG. 3 shows for F=$\frac{9}{10}$. Now the valley is considerably narrower, but the western area is dominated by a crater in which guidance is quite low. In this configuration, walkers can more easily locate the target-rich area, but then have difficulty homing in on individual targets.

To understand what guidance the gradient in the local concentrations of a pheromone actually gives to a walker, the spatial pattern of the concentration of a pheromone around one stationary pump is considered. Assume that the pump deposits one unit of the pheromone per unit time. This pheromone has an evaporation factor E$\in$(0,1), a propagation factor F$\in$(0,1), and a threshold S$\geq$0. The remaining local concentration of the pheromone at a place after one evaporation step is E times its strength one unit time before. The propagation of a deposit event from a place to any of its direct neighbors in one propagation step is F times the strength of the deposit received divided by the number of direct neighbors, as long as it is larger than or equal to S.

The spatial pattern of pheromone concentrations resulting from the pump's activities is in the simplest case symmetrically centered around the pump. It is appreciated that non-symmetric release is readily applied to model a wind directed pheromone plume. Assume that the pump is located at a place $p_0$. On the basis of $p_0$ the places of the hexagonal grid are structured into disjoint sets $P_d$. Each set $P_d$ includes all places that are reached from $p_0$ in d steps on the shortest path. $P_0$ only contains the pump's place $p_0$, and $P_1$ is the set of all direct neighbors of $p_0$. In general, the set $P_d$ comprises all direct neighbors of all places in $P_{d-1}$ that are neither in $P_{d-1}$ nor in $P_{d-2}$. The set $P_d$ (d>0) has nd elements where n is the sidedness of a grid system unit. For a hexagonal grid there are 6d elements. Altogether, there are 6*(2d−1) links from elements in $P_d$ to elements in $P_{d-1}$, 6*(2d) links to elements in $P_d$, and there are 6*(2d+1) links to places that are d+1 steps away from $p_0$.

A deposit of strength one by the pump at $p_0$ triggers a deposit of F/6 at every place in $P_1$. A deposit of strength F/6 at a place in $P_1$ triggers a deposit of $(F/6)^2$ at $p_0$, at two places in $P_1$, and at three places in $P_2$. In general, a deposit of strength s at a place in $P_d$ triggers a deposit of s*F/6 at an average of (2d−1)/d places in $P_{d-1}$, at two places in $P_d$, and at an average of (2d+1)/d places in $P_{d+1}$ (d>1). Each propagation step is assumed to take one unit time. The sum of the propagated deposits to a place in $P_d$ t time units after the deposit by the pump at $p_0$ is computed recursively as:

$$q(d, t) = \frac{F}{6} \begin{pmatrix} \frac{2d-1}{d-1} q(d-1, t-1) + \\ 2q(d, t-1) + \\ \frac{2d+1}{d+1} q(d+1, t-1) \end{pmatrix}$$

Since the pump repeats its deposit every unit time, a place in $P_d$ receives a propagated input of $$Q(d, t) = \sum_{j=0}^{t} q(d, j)$$

at an arbitrary point in time t. Following the analysis of the pheromone infrastructure in S. Brueckner. *Return from the Ant: Synthetic Ecosystems for Manufacturing Control.* Dr.rer.nat. Thesis at Humboldt University Berlin, Department of Computer Science, 2000, the pheromone concentration at a shortest distance of d steps from $p_0$ approaches the fixed point $$B(d) = \lim_{t \to \infty} (Q(d, t))/(1-E).$$

Figure 4:
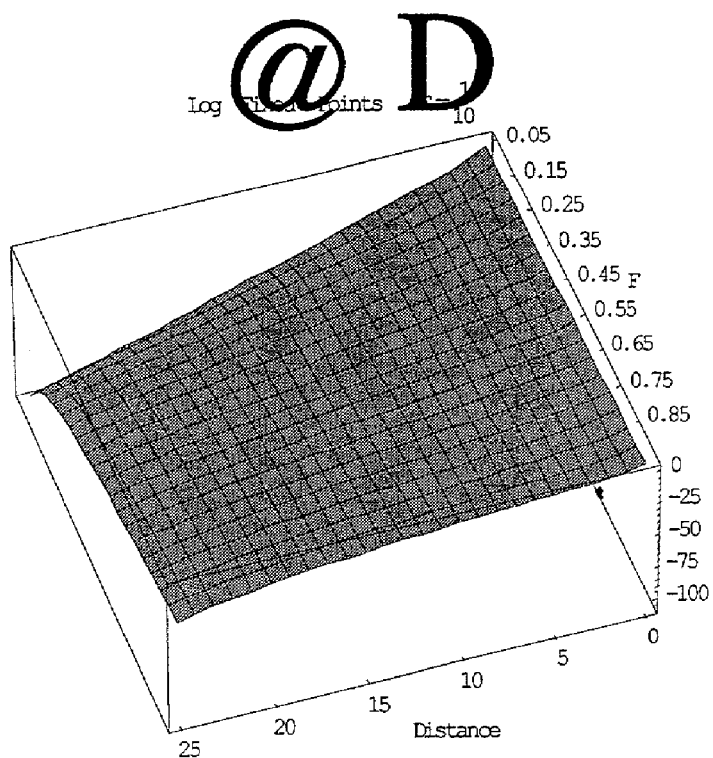
FIG. 4 is a log plot of fixed point pheromone concentration as a function of distance and propagation parameter for an evaporation factor of $E=\frac{1}{10}$.

The graph in FIG. 4 shows the fixed point of the pheromone concentration on a logarithmic scale for varying distances and propagation parameters with an evaporation factor fixed to E=1/10. As a consequence of the cyclic nature of the hexagonal grid, a rapid decline of pheromone concentrations is observed distal from the pump.

Figure 5:
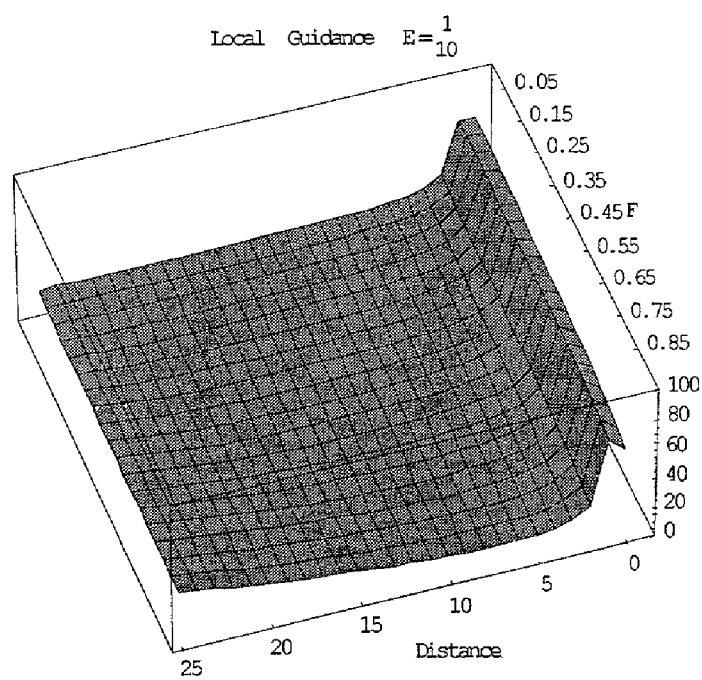
FIG. 5 is a local guidance plot as a function of distance and propagation parameter for an evaporation factor of $E=\frac{1}{10}$.

FIG. 5 shows the local guidance available to a walker from a single pump as a function of both distance from the pump and propagation factor.

Guidance is greatest at the pump (d=0) or in the places adjacent to it (d=1). Then it drops off rapidly. For low propagation the guidance is fairly constant with d. For high propagation, it drops somewhat lower than for low propagation, but only by a factor of two. Then it actually increases with increasing distance. This increase reflects the fact that the local guidance is an approximation of the second (spatial) derivative of the pheromone concentrations. As seen in FIG. 4, the decline of the pheromone concentration increases with increasing distance.

Figure 6:
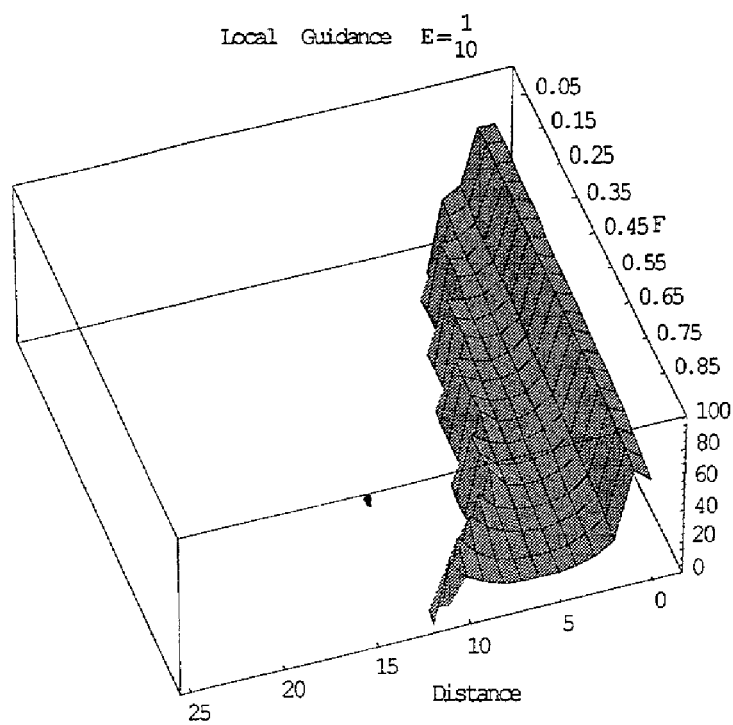
FIG. 6 is the local guidance plot of FIG. 5 upon application of a pheromone detection threshold.

Upon applying the threshold to the local guidance, a cliff emerges running from low d and low F to high d and high F as seen in FIG. 6. For large F values, an increase in the guidance towards the cliff is observed.

The local guidance available to a walker on $p_i$ may be influenced by several pumps. A pump influences the guidance on $p_i$, if the propagation field of the regular deposits of the pump covers at least one of the places in $C(p_i)$, the options in a walker's relocation decision at $p_i$. The radius of the propagation field of a pump depends on the pheromone's propagation factor and the threshold. The last place to receive a propagated input is at a distance of $R_F$=ln(S)/ln(F/6) steps away from the pump. Thus, if $p_i$ is less than $R_F$+2 steps away from a pump, its local guidance depends at least on this pump's propagation field.

If there are currently $n_i$ pumps that influence the local guidance at $p_i$, then the influence acts in two ways. First, there is the distance of a pump from $p_i$, which, in relation to the other pumps' distances, determines the strength of the influence of this pump, and second, the location of the place $p_i$ in relation to the nearby pumps also influences the local guidance.

If $n_i$ is zero, then there is no pheromone concentration at any of the places in $C(p_i)$ (assuming the concentrations have reached their respective fixed point). The relocation decision of a walker is a random selection of one of the seven places and the local guidance is zero.

If $n_i$ is one, the local guidance at $p_i$ depends on the distance from a single pump. As we have seen in FIG. 7, the guidance has local maxima very close to the pump and at the outer limit of the propagation field.

Finally, if $n_i$ is larger than one, several pumps influence the local guidance at $P_i$. We have been able to identify some scenarios of low or high local guidance, but numerical prediction is incomplete in this model.

If the place $p_i$ is significantly closer to one of the $n_i$ pumps than to all the others, the local guidance at $p_i$ is dominated by this nearest pump. In this case, the local guidance is predicted as in the single pump discussion. Our observations show that a difference of two or more steps in the distances of the $n_i$ pumps from $p_i$ is already sufficient to return to the single pump case.

If all $n_i$ pumps are about the same distance away from $p_i$, then the local guidance depends on the location of $p_i$ in relation to these pumps. If most pumps are in the same direction from $p_i$, then their effect is again similar to a single pump at the average distance of these pumps. Alternatively, if the place $p_i$ is surrounded by the pumps, the guidance effect is diminished. An extreme scenario exemplifying this diminishing effect is a pump at each direct neighbor of $p_i$. In this case, the pheromone concentration at six places in $C(p_i)$ is X and at one place it is Y, with X>>Y. The local guidance is reduced to approximately 1/6−1/7=1/42.

A primary dependency of the local guidance in a field of pumps on the pheromone's propagation factor F and on its threshold S has been shown. Secondarily, there is also a dependence on the location of the respective place in relation to the pumps whose propagation field cover the place or one of its direct neighbors. The second influence is only secondary, because it is the radius of the propagation field, determined by F and S, that allows multiple pumps to influence a place in the first place.

Thus, a pheromone is suitable for spatial coordination of walkers, namely high local guidance of walkers, in the close neighborhood of pumps about 5 steps, if it has a small propagation radius. It serves walkers at a medium distance from the pumps of about 20 steps, and preferably about 15 steps if it has a large propagation radius. Walkers at larger distances away from any pump cannot be guided by propagated pheromones, because the explosion in the required propagation out to such a distance.

Figure 7:
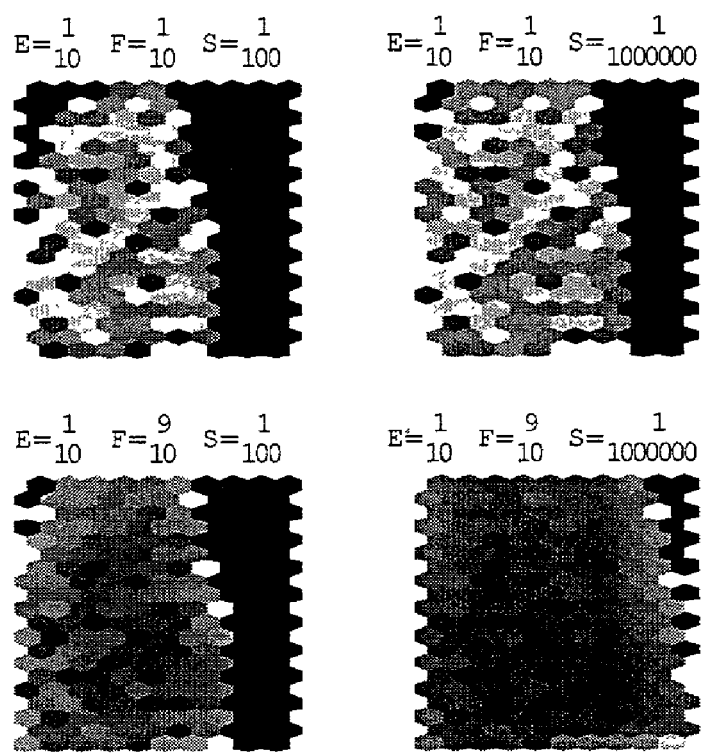
FIG. 7 are plots of local guidance over the grid of FIG. 1 as a function of varying combinations of $F=\frac{1}{10}$, $F=\frac{9}{10}$, $S=\frac{1}{100}$ and $S=\frac{1}{1,000,000}$.

A small propagation radius requires a relatively large threshold S or a small propagation factor F, whereas a large propagation radius is achieved with small S or large F. FIG. 7 shows the local guidance in the case of our field of fifty pumps for combinations of propagation factors $F=1/10$ and $F=9/10$, and thresholds $S=10^{-2}$ and $S=10^{-6}$. The plots show the best guidance in the regions near the pumps for the configuration $F=1/10$ and $S=10^{-2}$. The best guidance in the medium-distance areas is available for $F=9/10$ and $S=10^{-6}$.

Figure 8:
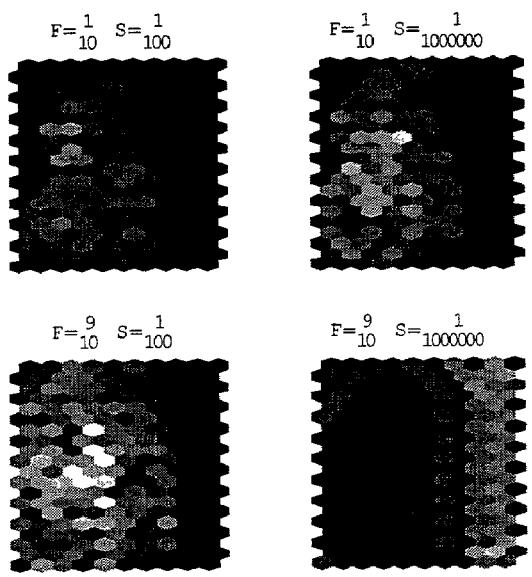
FIG. 8 are plots of local coverage, $R_P$ for the pheromone configurations of FIG. 7.

The underlying assumption in the prediction of the local guidance for a specific pheromone configuration is that there is a good guidance at places that are just at the outer limit of the propagation range of a small number of pumps. To verify this assumption, for each place on the grid the number of pumps that are exactly at a distance of $R_P$ from the respective place (local coverage) is plotted. Such a plot indicates areas of potentially high guidance for a given pump distribution and a specific pheromone configuration (F and S). FIG. 8 shows the plots for four pheromone configurations.

Comparing the local guidance plot of FIG. 7 with the coverage plots of FIG. 8, a link is observed between high guidance and medium coverage of a place. High coverage does not automatically mean high guidance since with increasing coverage there is also an increasing risk that the pumps are located in different directions from the place. Pumps at different directions of a place actually decrease the local guidance. The risk of having pumps located at about the same distance but in different directions increases with the number of pumps that significantly influence the local guidance of a place.

Figure 9:
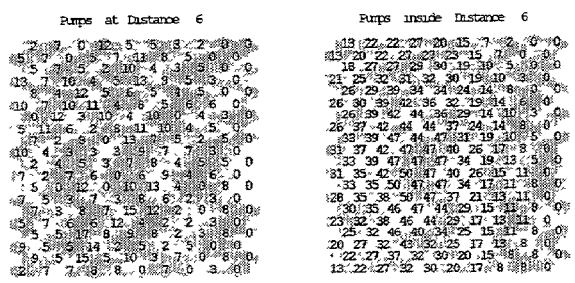
FIG. 9 are plots of the number of pumps at $R_P=6$ and $R_P \leqq 6$ for the FIG. 1 configuration of pumps.

FIG. 9 illustrates this effect for a propagation radius of six steps. The left plot shows for each place the number of pumps that are exactly six steps away, while the right plot shows the number of pumps that are maximally six steps away. From the plot $R_P \leq 6$ an indication results, where places with good guidance for a pheromone propagation radius of six are. Good guidance is expected to be at places with a small, but non-zero number of influencing pumps. The number may be larger the farther a place is outside a cluster of pumps.

The local guidance available to a walker in its relocation decision depends on its current distance to the pumps, the propagation radius of a pheromone, and the spatial distribution of the pumps. Even with stationary pumps, one pheromone configuration cannot always provide good guidance at all places.

The inventive vocabulary including at least two pheromones with different propagation radii overcomes this limitation. Thus, a first pheromone provides guidance near a pump, while a second pheromone guides a walker at medium distances. A walker that is a long distance away from the pumps relies on random walk, a third pheromone or an external input criterion.

The behavior of the pumps and the walkers is adapted to the enhanced vocabulary. Pumps regularly deposit a collection of pheromones, one for each specified pheromone configuration. All deposits have the same fixed strength.

A walker is able to perceive pheromones of different configurations separately. Thus, it is able to decide what pheromone to use for its probabilistic selection in its current relocation step. The walker always follows the gradient of the pheromone that currently has the highest local guidance at the place of the walker. Thus, it will automatically employ the pheromone most appropriate to its current location in relation to the pumps. In addition, the configuration of the selected pheromone allows the walker to estimate its current distance to the pumps.

The choice of the most appropriate pheromone vocabulary is guided by the availability of communication and processing capacity in the execution system, as well as by the typical spatial distribution of the pump population and its relation to the walkers.

The most straightforward choice would be a pheromone configuration for each propagation radius between one and approximately twenty steps with a maximal radius of approximately fifteen steps being preferred. Assuming all pheromones share the same propagation factor F, the required threshold $S_r$ for a given propagation radius r is computed as $S_r=(F/6)r$. However, practically speaking, pheromones with larger propagation radii often convey sufficient guidance at more than one distance away from the pump. Thus, the vocabulary may be reduced to save communication and processing resources.

Figure 10:
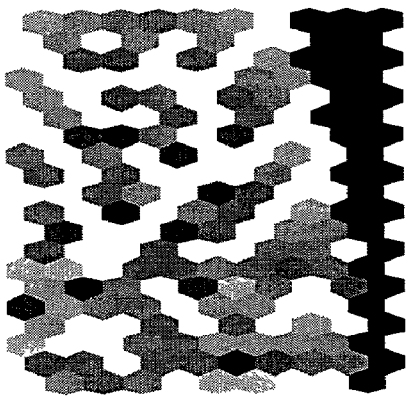
FIG. 10 is a plot of combined guidance for a six pheromone vocabulary having $R_P=1, 2, 3, 4, 5,$ and 6 for the pump configuration of FIG. 1.

FIG. 10 shows the combined guidance for a vocabulary of six pheromone configurations in the case of our pump population, including pheromones with propagation radii between one and six. As specified before, a walker always picks the pheromone with the maximum local guidance. As the plot shows, now there is good guidance at places near the pumps as well as at medium distance places.

An adaptive approach automatically strikes the balance between complete coverage of the vocabulary space and optimization of the execution performance. Initially, the pumps deposit pheromones configured for all possible propagation radii. In addition to moving towards the pumps, each walker keeps a profile of the usage of the different pheromone configurations, and reports this profile regularly to the pumps it meets. Pheromone configurations that are seldom used either cover areas where walkers never reach, or convey low guidance. Such configurations have a higher chance of being dropped from the active vocabulary of the pumps. To accommodate possible changes in the system's dynamics, configurations that have been dropped are introduced back into the vocabulary at random intervals.

Figure 11:
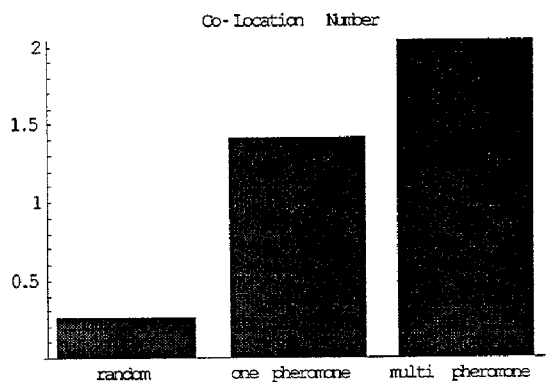
FIG. 11 is a bar graph of co-location number for random, one pheromone and six pheromone relocation strategies.

The expected improvement in the performance of the walker population is shown in FIG. 11. The baseline performance is measured in the random walk selection of the next location. This is compared to the probabilistic, pheromone-biased selection, always following the guidance of the same pheromone and six separate pheromone configurations, resulting in propagation radii between one and six. A walker first selects the pheromone with the highest local guidance and then its next location following this pheromone's gradient.

Since different individual walkers move independently, it is sufficient to observe only one of them as it walks over the grid. The walker is placed randomly on the 10×10 hexagonal grid and is permitted to relocate one hundred times. This test is repeated one hundred times, each time with a different random seed, to capture statistically significant data.

The pump population of fifty individuals is placed on the grid as in FIG. 1. Each pump deposits a pheromone from each configuration with one unit strength each unit time.

The performance of the walker is measured as the average number of pumps with which the walker shares the same place in each cycle, defined as the walker's co-location number.

Theoretically, the best possible co-location number in the chosen setup of the pump population is five pumps, since there are two places with five pumps. But this ignores the random initial placement of the walker, since a walker has to spend some time before it may get to a place with five pumps. Then there are eight places with three and eight places with two pumps.

In FIG. 11 the co-location number is observed for the three different relocation strategies. In the chosen configuration, a random walker shares a place with an average of 0.26 pumps. A walker that always follows the pheromone with a propagation radius of three shares its place with an average of 1.41 pumps. This is an improvement of a factor of 5.4 compared to the random baseline.

A walker that takes all six pheromones into account achieves a co-location number of 2.05 pumps. Thereby it performs 7.9 times better than random. The improvement against the one-pheromone relocation strategy is still significant with a factor of 1.5.

A multiple pheromone pump is coupled with an agent class to yield structural knowledge of the agents to provide distances from a specific pump target. The ability of a distance agent to update pump target concentration assures a robust pump target communication to a decision maker or seeker within the area.

An Agent Runtime Environment

An agent in the inventive agent runtime environment is an instance of a JAVA object that is derived from the general "Agent" class. The state of the agent is represented by the values in the data slots of the agent's object and the activities are specified in its methods. It will be readily apparent to one skilled in the art that the use of JAVA is illustrative rather than definitive of the invention herein described, and that implementations in other computer languages or other computational architectures are also possible and fall within the invention herein claimed.

The agent runtime environment is represented by an instance of a JAVA object that is derived from the general "World" class. The "World" object manages the pheromone infrastructure where the agents operate in, and it handles the operation of the agents.

The agent runtime environment creates and initializes agents from specification files or upon request by other agents. It schedules the agents' execution, and eventually it removes them from the environment.

The agent runtime environment is an instance of a "World" object or of one of its deriving classes. Each "Agent" has an internal "_world" variable that contains a reference to the agents runtime environment. Following this reference, the agent may access the services of its runtime environment.

Every inventive agent is assumed to be operating in the pheromone infrastructure. Thus, the general "Agent" class already defines an internal variable "_place" that contains a reference to the current location of the agent. If the agent wants to access services of its place, it follows this reference.

Any other knowledge of an agent is contained in data slots specified in objects that derive from the "Agent" class. Such knowledge specifies the state of the respective agent type.

An agent in the experiment is an instance of a software object derived from the general "Agent" class. The "Agent" class specifies the following methods that may be replaced by activities specific for the respective agent:

boolean initialize(World world, Place place, String name)
  This method is called by the agent runtime environment once before the agent is executed. It tells the agent in which world it is executed and at what place it should register first. Furthermore, each agent is given a (unique) name. If the agent is unable to prepare its execution, it returns a "false" value, otherwise "true" is returned.

boolean run( )
  In each cycle the "run" method of every agent is called once, to allow the agent to update its state. Here the actual agent activities take place. If the agent returns a "true" value, it thereby signals that it has completed its tasks and that it wants to be removed from the runtime environment.

void finish( )
  Before an agent is actually removed from the runtime environment, its "finish" method is called once to permit it to do any cleanup necessary.

The general "Agent" class specifies default operations for each of the methods. These methods are designed to remove the agent from the environment as fast as possible, because "Agent" instances are not intended to achieve any task. Thus, the generic "initialize" method always returns a "false" value and "run" just returns "true" without doing anything else.

The agent types employed in a specific application may define additional methods structuring their execution or providing access to their internal variables for observation.

There are two ways of observing the activities of the agents. The agents may be observed graphically during execution in a user interface and the agents may dump state and activity information into a log file.

The generic "Agent" class specifies a "draw" method that draws the agent at a given location. The specific agent type may overload this definition to encode the current agent state in the form and color of the icon shown.

The format of the data logged by an agent depends on the agent's type. The generic "Agent" class specifies a "report" method that returns a JAVA String object. During execution the "report" method of each agent is called once in each update cycle. The "report" methods are called after all agents have been updated and the String objects are sent to the "System.out" stream of the JAVA virtual machine. Each agent should include its name and type into the report, so that the log file may be filtered for specific information later.

The pheromone infrastructure comprises of a set of places that are linked among each other according to the layout specified in the agent application. A place is represented by a specific agent type "place".

A place agent knows its neighbors, its local pheromone concentrations, and the agents that are currently located there. In each cycle, the place updates the local pheromone concentrations, realizing pheromone aggregation, propagation, and evaporation. The agents that are currently registered may request the services of the place by calling its public methods.

The agent systems explored in this inventive embodiment all operate in a regular layout of places that represents a polygonal grid. A hexagon in the grid is a place and it is generally linked to six other places excluding boundary places. However, the invention also applies to irregular networks of places in which all places need not have the same number of neighbors or be responsible for the same amount of territory. For the purpose of the discussion of the agent behavior, the following naming conventions are used when considering an arbitrary place P and its six neighbors $p_1, \ldots, p_6$.

A place $p_i$ is a one-step neighbor of $p_j$, if $p_i$ and $p_j$ are direct neighbors on the hexagonal grid. The set $P_1, \ldots, p_6$ is considered ordered, so that each place $p_i$ is a one step neighbor of $p_{i+1}$ and $p_6$ is a one-step neighbor of $p_1$, and the ordering is assumed to be clockwise for all places P, starting at the place in the north. Two places $p_i$ and $p_j$ are adjacent, if there exist two other places $p_k$ and $p_l$ ($p_k!=p_i$, $p_k!=p_j$, $p_l!=p_i$, $p_l!=p_j$), so that $p_k$ is a one-step neighbor of $p_i$, $p_l$ is a one-step neighbor of $p_k$, and $p_j$ is a one-step neighbor of $p_l$.

A pheromone is an instance of an object that is derived from the general "Pheromone" class. All instances created from the same class are said to belong to the same pheromone type. The "Pheromone" class defines three parameters for each pheromone. The parameters are the pheromone type's propagation and evaporation factors F and E, and the threshold value T. Furthermore, each pheromone has a data slot "strength" that specifies the amount of the pheromone represented by the instance.

In general, there are two ways a pheromone is created. Either a new instance of the pheromone type's JAVA class is created using the "new" command directly. Or, the method "createPheromone" of the "World" class or its descendant is called. The advantage of the direct creation is that specific constructors of the pheromone may be accessed.

The creation through the "World" object requires that the pheromone type is recognized by one descendant of "World". The parameters specifying the pheromone are handed over to the "createPheromone" method in a "Vector" object, which is passed on to the constructor of the pheromone type. The indirect creation of pheromones through the runtime environment has the advantage that the environment may keep track of the pheromones that had been created in the run of the application. This recollection is then used in the dynamic observation of specific pheromone types.

The pheromone infrastructure represented by the places emulates three real-world pheromone processes. Pheromones of the same type are aggregated in strength, the event of a pheromone deposit is propagated through the spatial structure, and local pheromone concentrations are reduced in strength over time through evaporation.

An agent that is located at a place in the pheromone infrastructure may deposit any amount of a pheromone there. To deposit a pheromone the agent has to create a new instance of the class that specifies the respective pheromone type first. The amount of the deposit is set in the instance's "strength" slot. Using the "addPheromone" method of the place, the agent then initiates the aggregation.

The "addPheromone" method first hands the request to the pheromone management of the place, which handles all local pheromone concentrations. There the incoming pheromone is compared to the ones that already exist at the place using the "equalsForAggregation" method of the pheromone type. If a matching pheromone is found, the incoming strength is added to the existing strength. If no match can be made, the incoming pheromone itself is entered into the management.

After the deposit has been handled locally, the place's "addPheromone" method realizes the propagation of the deposit event.

Figure 12:
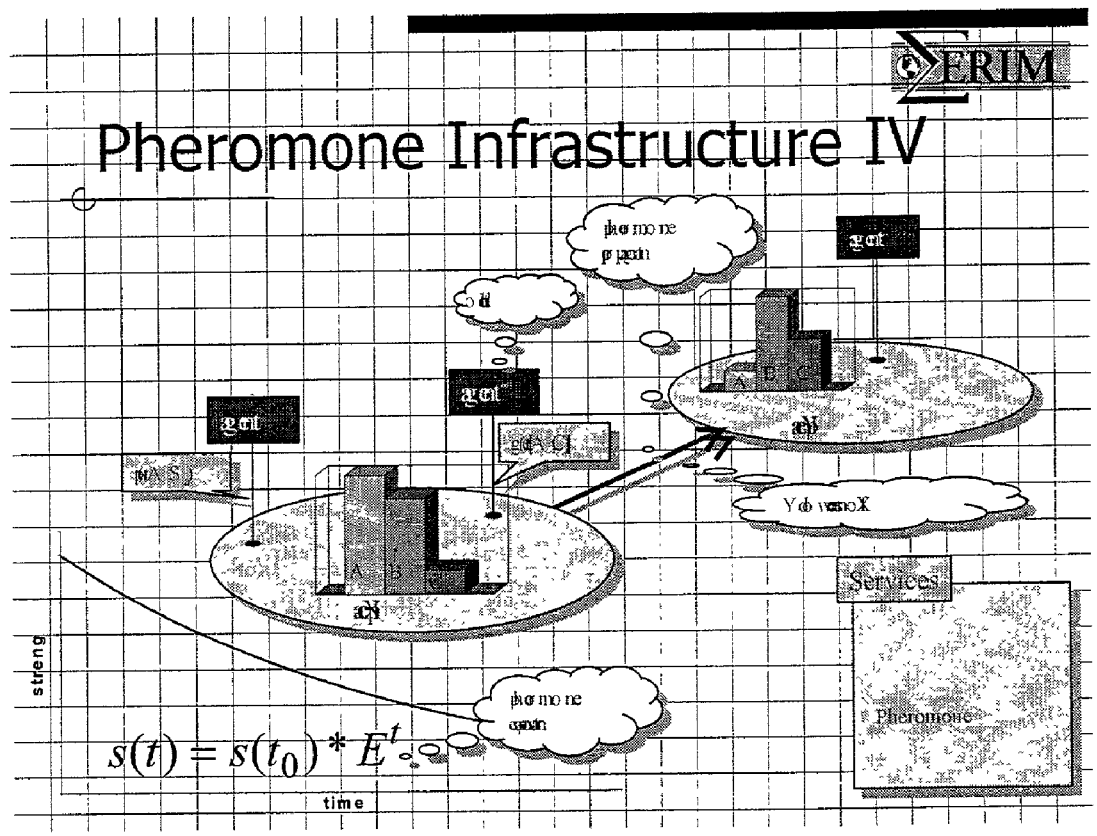
FIG. 12 is a schematic drawing of pheromone propagation and evaporation in an agent neighborhood.

The event of a pheromone deposit by an agent at one place is propagated to the neighborhood of that place if the pheromone type's propagation factor F is not zero. The propagation occurs stepwise recursive from one place to its direct neighbors as shown in FIG. 12. In each propagation step, the strength of the propagated deposit is reduced until the pheromone type's threshold value T has been passed. Once an incoming deposit is smaller than T, it is still aggregated locally, but it is not sent further to the place's neighbors.

The strength of the deposit that is propagated to one of a place's neighbors is computed from the incoming deposit by multiplying it with F and then dividing it by the overall number of neighbors at that location. Thus, the "output" of a place is always weaker than its "input" as long as F is smaller than one.

The propagation to the neighboring places occurs instantaneously, right after the deposit has been added to the local pheromone management.

Each pheromone type may specify two filtering methods that change the pheromone deposit when it arrives at a place (method "applyArrivalFilter") or just before it is sent to a neighboring place (method "applyDepartureFilter"). Both methods are declared in the generic "Pheromone" class already and they both return a boolean value. If a filtering method returns false, the specific pheromone is immediately erased, effectively blocking one propagation path.

All pheromones that are stored in the pheromone management of a place are reduced in strength over time. The rate of the decrease is determined by the pheromone type's evaporation factor E. If the strength of a pheromone was s at time t and no deposits (propagated or external) had been made, then at time t+1 the strength is reduced to s*E as shown in FIG. 12.

The evaporation of pheromone concentration is realized asynchronously in an as-needed fashion. For each pheromone stored in the pheromone management a time stamp stores the moment of the last update. Whenever an up-to-date pheromone strength is needed, for example when the pheromone is accessed by an agent, the current strength is then computed from the last update and the time that has passed since then.

The most important service a place provides to the agents that are located there is the pheromone service. The place provides methods for the agents to deposit and to access pheromones. The single deposit is realized by the "addPheromone" method.

A common agent behavior in many applications is the repeated deposit of a pheromone of a fixed strength at regular intervals. To unload the agents from this repeated activity and to reduce the effort in communications among the places required to propagate the regular deposits, an agent may register the regular deposit with its place. Then the place makes sure that the pheromone concentrations evolve as if the agent was regularly depositing.

Each place keeps a regular deposit registry. An agent that wants to register a regular deposit calls the place's method "registerRegularDeposit" and specifies the fixed pheromone deposit and the deposit rate together with a specific identifier for this registration.

The registration method mimics the aggregation and propagation process. It stores the request in the local registry, aggregating the strength of requests with the same identifier. And it propagates registry requests of weaker strength to the local neighbors until the pheromone type's threshold value T has been passed.

The emulation of the agent's regular deposit behavior by the places is done asynchronously. Following on the registered deposit rate, a place realizes a local deposit of the registered pheromone without propagating it then to the neighbors. The propagation had been taken care of in the registration process already.

The place's deregistration method allows the agent to stop the regular deposits using the registration's identifier. The place propagates the deregistration to all its neighbors as long as it finds a registration matching the identifier in its own registration management.

The place provides a "getPheromone" method that permits the agents to access the local pheromone concentrations. An agent may specify a pheromone in its call to the method that serves as a mask to the access. "getPheromone" only returns those pheromones that matched the mask when applying the pheromone's "equalsForPerception" method. Depending on the type specific implementation of that method, one pheromone or sets of pheromones may be returned by "getPheromone" in a "Vector".

The local concentrations of a pheromone type may be observed on-line or off-line. On-line observation is realized by the graphical user interface. It allows to select one pheromone out of those that had been created using the runtime environment's "createPheromone" method. The spatial strength pattern of the selected pheromone at the time of the selection is then used to color the background of the graphical representation of the places in the hexagonal grid.

For the off-line observation of the evolution of pheromone patterns the runtime environment may log the spatial strength pattern of pheromones at regular intervals. The pheromones that are to be logged and the rate with which the patterns of a pheromone are recorded are specified in the initialization of the runtime environment. The data is sent to the "System.out" stream of the JAVA virtual machine.

An Agent System—Pheromone Architecture

A first embodiment of the invention is based on the propagation of multiple pheromones through the pheromone infrastructure, using the propagation mechanism of the places. The pumps deposit the pheromones and the walkers follow the pheromone guidance, employing different levels of sophistication.

The population of pumps moves independently in the grid of the pheromone infrastructure. Each agent has two individual relocation cycles in which it determines its next location asynchronously to all other pumps. The relocation cycles of all pumps in one experiment have the same mean length.

The cycle in which a pump deposits its pheromones is decoupled from its relocation cycle. Each pump regularly deposits a specified set of pheromones of a fixed strength. The mean length of a deposit cycle as well as the fixed deposit strength is equal for all pumps in an experiment.

The first relocation cycle of a pump determines its intentional movement. Following a specific movement strategy, a pump regularly selects one of the places in the direct neighborhood of its current location (including the current location) and moves there. The movement strategies of a pump include: no movement with a pump always selecting its current place as the next location; random movement with a pump randomly selecting from the available options without any probabilistic bias; and tilted movement with a pump randomly selecting from the available options with a probabilistic bias for places in a fixed direction.

Figure 13:
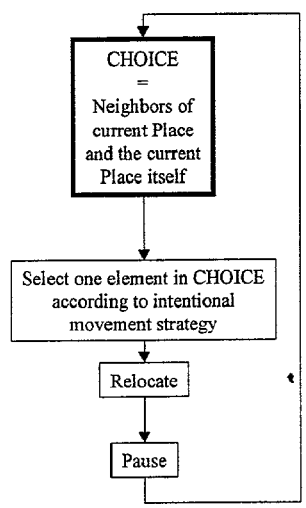
FIG. 13 is a block diagram illustrating the steps of a pump relocation cycle.

The intentional movement cycle preferably runs in three steps as summarized in FIG. 13. These steps include: determining all direct neighbors of the current place and joining them in the set of options together with the current place itself; according to the specified strategy, selecting one of the available places and relocating there, with the agent deregistering with its current place first and then registering with its new place; and pausing for a probabilistically selected time span (rate of movements). The duration of the pause is taken from a probability distribution that has a mean and variance as specified globally for all pumps in the setup of the experiment. After the pause the cycle is restarted at the determination step.

The second relocation cycle of a pump introduces random fluctuations in the location of the pump. A fluctuation is a relocation of the pump to a neighboring place followed by a return to the previous location after a short time. The duration of a fluctuation is assumed to be significantly shorter than the mean length of the intentional relocation cycle.

Figure 14:
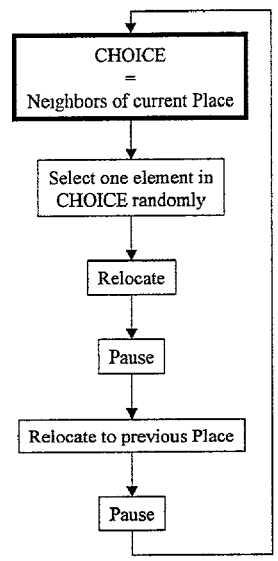
FIG. 14 is a block diagram illustrating the steps of a pump fluctuation cycle.

The fluctuation cycle runs in steps summarized in FIG. 14. These steps include: determining all direct neighbors of the current place and joining them in the set of options, with the current place itself not being an element of this set; selecting one of the available places randomly and relocating there, with the agent deregistering with its current place first and then registering with its new place; pausing for a probabilistically selected time span (duration of the fluctuation). The duration of the pause is taken from a probability distribution that has a mean and variance as specified globally for all pumps in the setup of the experiment. After the pause continue with the next step. The agent then relocates to the previous location. The relocation procedure requires the agent to deregister with its current place first and then to register with its new place. Thereafter, the agent pauses for a probabilistically selected time span (rate of fluctuations), with the duration of the pause taken from a probability distribution that has a mean and variance as specified globally for all pumps in the setup of the experiment and after the pause the cycle is restarted at the determining step.

The third cycle a pump runs is the pheromone deposit cycle. The setup of an experiment specifies a set of n pump-pheromone types $(P_1, \ldots, P_n)$. Each pump-pheromone type has a unique propagation factor $(F_1, \ldots, F_n)$ and a unique propagation threshold $(S_1, \ldots, S_n)$, but all share the same evaporation factor (E). Additionally, the setup specifies a fixed strength A, with which all pheromones of the pump-pheromone type are deposited.

In every deposit cycle, a pump creates a pheromone of each of the specified types and deposits them all at its current place. The execution of the deposit may never occur in parallel to the execution of a movement, because then there would be moments when the agent is not located at any place where it could deposit the pheromones.

In the initial embodiment, no pump-pheromone type specifies additional data slots and thus there can be only one pheromone to each type. But in general, the pump population may be structured into several sub-populations, whose members should be followed separately by different walkers or by the same walkers but with different preferences. In this case, the pump-pheromone types all specify the same set of additional data slots that permit the pumps to create their pheromones specific for the sub-population they belong to. But, assuming that a pump may be only member of one sub-population at a time, each pump still creates only one pheromone per pheromone type and deposit cycle.

Figure 15:
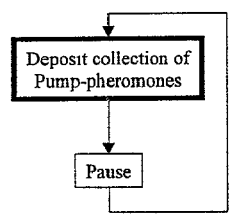
FIG. 15 is a block diagram illustrating the steps of a pump pheromone deposit cycle.

The pheromone deposit cycle of a pump runs as shown in FIG. 15. This cycle includes the steps of creating a set of n pheromones of strength A, each pheromone being of one of the n pump-pheromone types, with the creation of the pheromones employing the runtime environment's method "createPheromone" to make the pheromones available for on-line observation; depositing all pheromones at the current place, with the deposit of a pheromone being realized through a call to the place's method "addPheromone", which will take care of the aggregation and propagation; and pausing for a probabilistically selected time span (rate of deposits). The duration of the pause is taken from a probability distribution that has a mean and variance as specified globally for all pumps in the setup of the experiment. After the pause the cycle is restarted at the creation step.

In the case that the deposit cycle runs at a much faster rate than either of the two movement cycles, the pumps may employ the regular deposit registry of their current place. If the setup of the experiment specifies such a behavior, the agent would not run a deposit cycle. Instead each relocation from one place to the next would require a deregistration of n regular deposits (one for each pheromone type) with the old place and a registration of the regular deposits with the new one.

Walker

A population of at least one and preferably a plurality of walkers moves through therid of the pheromone infrastructure. Each walker tries to maximize its co-location number. The co-location number of a walker is specified as the time spent at the same place as a pump added up for all pumps in the system and set into relation to the absolute duration of the experiments multiplied by the number of pumps. The co-location number $c_i$ of walker i is $$c_i = \sum_{j=1}^{m} t_j / (m^* t_E),$$

with m the number of pumps, $t_j$ the time spent at the same location as pump j, and $t_E$ the duration of the experiment. The joint co-location number C of the walker population is the sum of the individual co-location numbers.

Each walker in an operative system preferably runs the same relocation cycle and follows the same relocation strategy. The relocation cycle of a walker includes the steps of: determining all direct neighbors of the current place p and joining them in the set of options (C(p)) together with the current place itself; according to the specified strategy, selecting one of the available places and relocating there, with the agent deregistering with its current place first and then registering with its new place; and pausing for a probabilistically selected time span (rate of relocations). The duration of the pause is taken from a probability distribution that has a mean and variance as specified globally for all walkers in the setup of the experiment. After the pause the cycle is restarted at the determination step. Relocation strategies are illustrative of those operative in the present invention. They specify how a walker agent determines its next location from the set of currently available options (C(p)) and include random, one-pheromone guidance, and multi-pheromone guidance.

Figure 16:
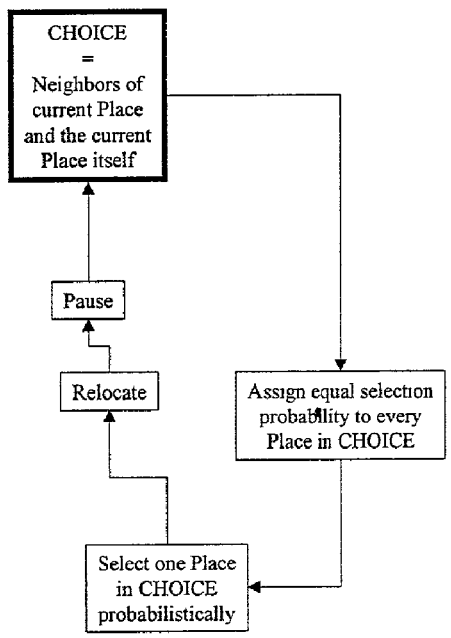
FIG. 16 is a block diagram illustrating the steps of a pump walker random relocation cycle.

A random relocation strategy does not specify any pump-pheromone type and thus the pumps do not deposit any pheromones. A walker selects its next location randomly, without any probabilistic bias, from the set of currently available options as summarized in FIG. 16.

A one-pheromone guidance relocation strategy specifies only one pump-pheromone type. Each pump deposits one pheromone of this type in every pheromone deposit cycle. All walkers are set up to include this pheromone into their selection of the next place.

As the first step in the decision process, a walker samples the strength of the specified pheromone for all currently available places. This is a service realized by the local place, because normally an agent has to be registered at a place to get access to its pheromones. For each place $p_i$ in the set of options, the walker perceives a strength $s_i$ of the pheromone.

In the second step the walker computes the relative attraction $f_i$ of each place $p_i$ in the set of O options. The relative attraction a walker computes as:

$$f_i = s_i / \sum_{j=1}^{o} s_j.$$

Figure 17:
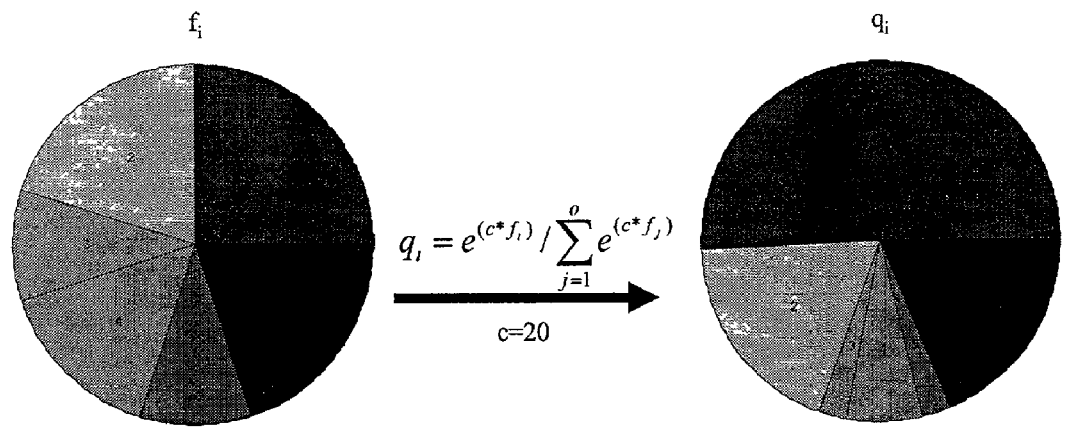
FIG. 17 is a diagram illustrating the relative attraction and probability for a walker to take a given step on a hexagonal grid based on one pheromone guidance.
Figure 18:
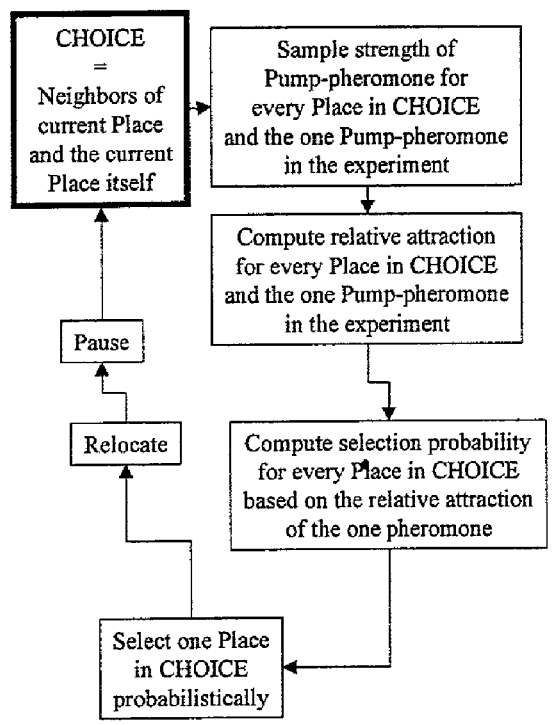
FIG. 18 is a block diagram illustrating the steps of one pheromone guidance walker place selection.

From the relative attraction of each place, the walker computes in a third step the probability to select this place in a probabilistically biased random decision. The probability $q_j$ of a place $p_i$ to be selected is determined by the following equation:

$$q_i = e^{(c^* f_i)} / \sum_{j=1}^{o} e^{(c^* f_j)},$$

with c representing a tuning parameter that is specified in the experiments. FIG. 17 shows the relative attraction and probability of a walker on a hexagonal grid for an illustrative tuning parameter c=20 for an exemplary step. The sequence of steps for one-pheromone guidance is summarized in FIG. 18.

Finally, the walker selects a place from the set of currently available options in a probabilistically biased decision. The probability for a place $p_j$ to be selected is $q_i$.

A multi-pheromone guidance selection specifies n pump-pheromone types and thus the pumps regularly deposit a pheromone of each of these n types at their current place. The walkers are set up to perceive these pheromones and they include these pheromones into the decision process in their relocation cycle.

Figure 19:
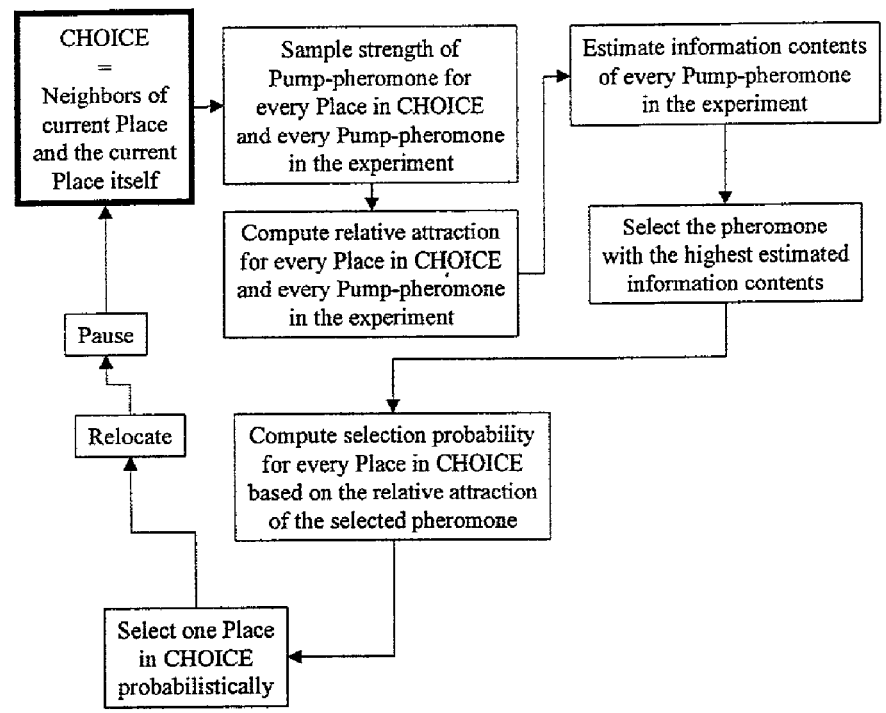
FIG. 19 is a block diagram illustrating the steps of multi pheromone guidance walker place selection.

The decision process of the simple multi-pheromone guidance strategy runs in two major steps as summarized in FIG. 19. First, one of the pheromones is selected to provide the local guidance. In the second step, the walker then selects its next location as specified in the single pheromone guidance strategy, perceiving the selected pheromone. Thus, only the first step remains to be specified here.

First, the walker determines the relative attraction $f_{(i,j)}$ for each for the specified pheromones Pi and for each place Pj in the set of currently available options. Then, the agent estimates the local information contents Fi of each pheromone Pi as the maximum relative attraction $$\left(F_i = \max_{j=1 \ldots o}(f_{(i,j)})\right).$$

The pheromone the walker finally selects for guidance is the one with the highest local information contents.

An Agent System—Distance-agent Architecture

Another embodiment of the invention is based on the spreading of distance information through additional carrier agents, called distance-agents. Each pump creates its own field of distance-agents around its current location. The distance-agents deposit Distance-pheromones whose local concentrations may be interpreted as distance profiles. The walkers sample the distance profiles and triangulate the pumps. There is no pump-pheromone type in this architecture.

Distance-pheromones are deposited by pumps and distance-agents and they are perceived by walkers. A Distance-pheromone is identified by one additional data slot, called "distance". The value in this slot is a natural number from the interval [0,D). The global constant D represents the maximal extension of a distance-agent field around a pump. A Distance-pheromone is intended to represent the length (in steps) of a shortest path on the hexagonal grid, starting at the location of the pheromone and ending at a place of a pump.

The Distance-pheromone type specifies a propagation factor (F) of zero. Deposit events of a Distance-pheromone are not propagated to the neighboring places. The spreading of distance information is the specific task of the distance-agents.

At any place an agent may perceive D different Distance-pheromones, one for each possible path length. A distance profile is the set of local Distance-pheromone concentrations, sorted according to the values in the "distance" slot of the pheromones, and normalized by 1/(1−E), with E representing the Distance-pheromone type's evaporation factor.

The intentional movements and the fluctuations of the pumps are as described with reference to the Agent System—Pheromone Architecture embodiment. Only, the relocation to a different place is extended to cover the change of the distance-agent field around the pump.

A pump does not deposit pump-pheromones, but it regularly deposits a Distance-pheromone with the "distance" slot set to zero. The strength of the deposit is one and the rate is one deposit every unit time. But, instead of running a deposit cycle, the pump just registers a regular deposit with its current place.

In the Agent System—Pheromone Architecture embodiment, the relocation of a pump to a neighboring place in an intentional movement or in a fluctuation required only a de-registration from the current place and a registration with the new place. Herein, there are additional steps executed by the pump including: canceling the current distance-agent field; canceling the regular deposit of a Distance-pheromone ("distance"=0, strength=1, rate=1) registration at the current place; de-registering from the current place; registering with the new place; registering a regular deposit of a Distance-pheromone ("distance"=0, strength=1, rate=1) with the new place; and establishing a new distance-agent field.

The establishment as well as the cancellation of a distance-agent field in the neighborhood of a pump is a recursive procedure triggered by the pump. To establish the field, the pump creates a distance-agent at each neighboring place. The agents' "distance" parameter is set to one, its "segment" parameter is set to zero, and it is told the current place of its parent (cf. paragraph "Distance-Agent"). The pump keeps a reference to these distance-agents.

To cancel the distance-agent field before a pump leaves its current place, the pump contacts the distance-agents it had created when the field was established and tells them to cancel the field.

The distance-agents of a given pump arrange themselves in a spatial pattern around the pump. They deposit a Distance-pheromone that matches their respective distance to the pump. A distance-agent does not move on the hexagonal grid. It just stays where it has been created. A distance-agent has two constant parameters, which are set when it is created. The first parameter—"distance"—specifies the agent's distance to the pump, which is the length (in steps) of the shortest path to the current place of the pump. The second parameter—"segment"—specifies the agent's location in the segment of distance-agents that share the same "distance" parameter. On the hexagonal grid the combination of "segment" and "distance" specify the location of a distance-agent in relation to its pump in polar coordinates. The dynamic memory of a distance-agent contains the references to the agents it has created and a reference to the regular deposit registration with its place. A distance-agent does not operate in a cycle. Instead, its activities are triggered by events.

Event 1: Distance-Agent Created

The first event triggering distance-agent activities is its creation by another agent. As a consequence, the new distance-agent first registers with its new location and then it attempts to create two distance-agents itself. The first child is created at the place adjacent to the parent of the new distance-agent, if: this place exists, the "distance" parameter of the new agent is smaller than D-1, and the "segment" parameter of the new agent is zero. If the child is created, it is given a "distance" parameter that is the "distance" parameter of its parent plus one. The "segment" parameter of the child is zero.

Figure 20:
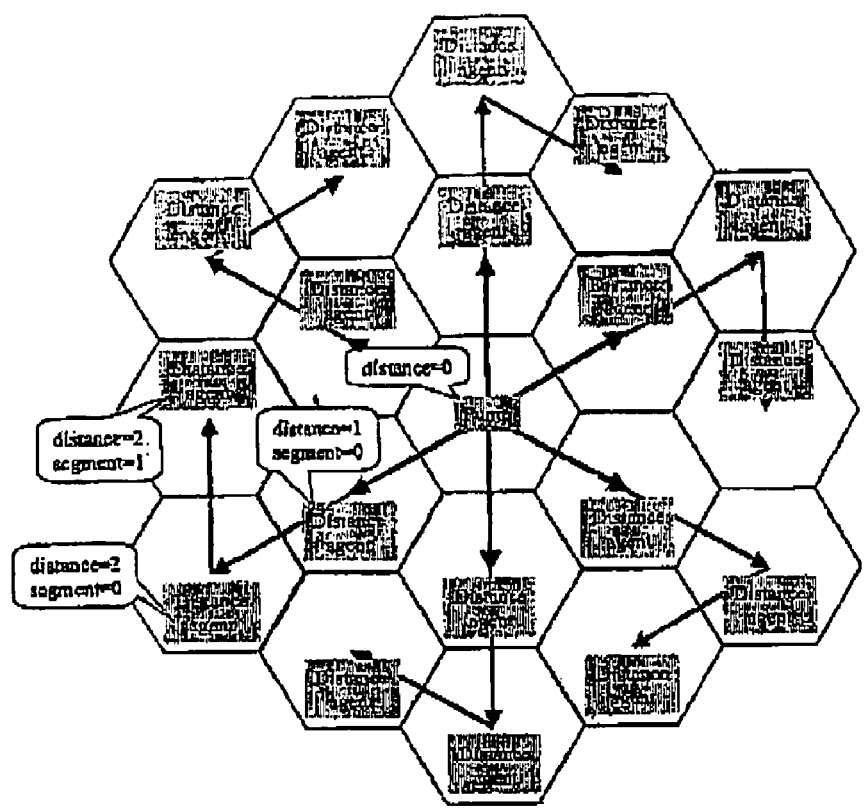
FIG. 20 is a hexagonal grid centered around a pump illustrating distance agent creation in a distance agent architecture embodiment.

The location of the second child created by a new distance-agent depends on the "segment" parameter of the agent. If "segment" is zero, the child is put at the place that is the clockwise one-step neighbor of the place where the parent of the new distance-agent resides. If "segment" is different from zero, the child is placed adjacent to the parent's place. The child is created, if: its place exists, and the "segment" parameter of the new agent is smaller than its "distance" minus one. If the second child is created, it is given the same "distance" parameter as its parent. Its "segment" parameter is the "segment" parameter of its parent increased by one. The creation of distance agents about an isolated pump is shown for a distance of two steps in FIG. 20.

After a new distance-agent attempted to create its two children, it registers a regular deposit of a Distance-pheromone that is specified by the agent's "distance" parameter. The strength of the regular deposit is one and the rate is one deposit per unit time. The distance-agent stores the reference to the regular deposit registration in its dynamic memory.

Event 2: Field Canceled

The second event triggering distance-agent activities is the request by the agent's parent to cancel the field. The agent then asks its children in turn to cancel the field. Then, it cancels the registration of a regular Distance-pheromone deposit at its current place. Finally, the agent de-registers from its current place and finishes.

In the distance-agent architecture, the walkers still run the same relocation cycle as in the Pheromone architecture embodiment. It is just a different set of strategies to select the next location that is applied by the agents. The individual and joint success of the walkers is still measured through their co-location number.

Relocation strategies available to a walker illustratively include minimal distance and minimal distance weighted by pump concentration. These relocation strategies start with the sampling of the distance profile for each place in the set of currently available options (C(p)). The normalized strength of the Distance-pheromone representing a distance of i steps ("distance"=i) at the place $p_j$ in C(p) is denoted by d(i,j).

In a minimal distance relocation strategy, a walker first applies a constant threshold $T_{min}$ to all d(i,j). The threshold is significantly smaller than one.

Figure 21:
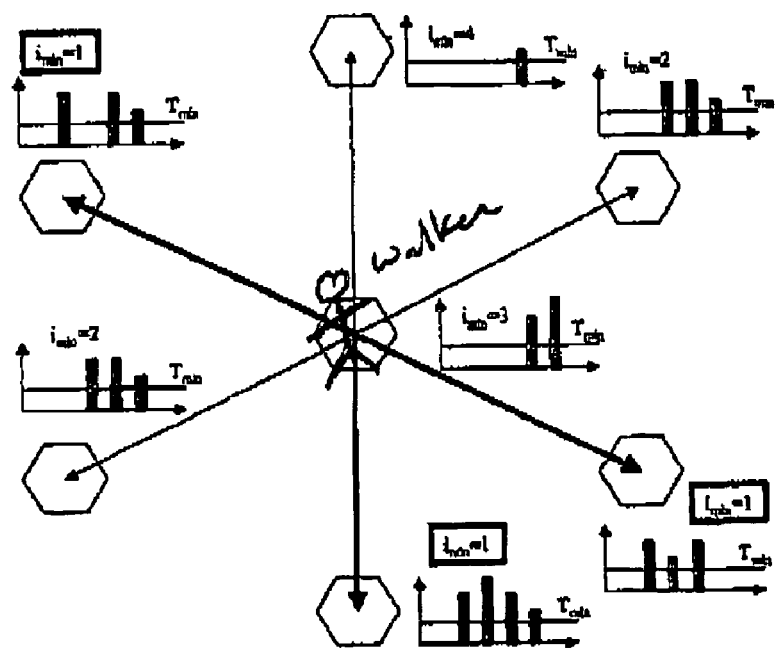
FIG. 21 is a graphical representation of an exemplary walker relocation step in a minimal distance strategy in a distance agent architecture.

A walker then selects the place $p_j$ in C(p) that has a d(i,j) above $T_{min}$ for the smallest i. This place is the one closest to at least one pump in the whole neighborhood of the walker. If there is more than one such place, the walker selects one of them randomly. This approach is shown graphically in FIG. 21, where a walker will select randomly between northwest, south and southeast steps.

In a minimal distance weighted by pump concentration relocation strategy, a walker first computes a relative attraction for each place in C(p), based on the place's local distance profile and a global weight constant W (W∈(0,1)). The relative attraction $f_j$ of a place $p_j$ in C(p) is defined as:

$$f_j = \frac{\sum_{i=0}^{D-1} d(i,j)^* W^i}{\sum_{p_\lambda \in C(p)} \sum_{i=0}^{D-1} d(i,k)^* W^i}.$$

Figure 22:
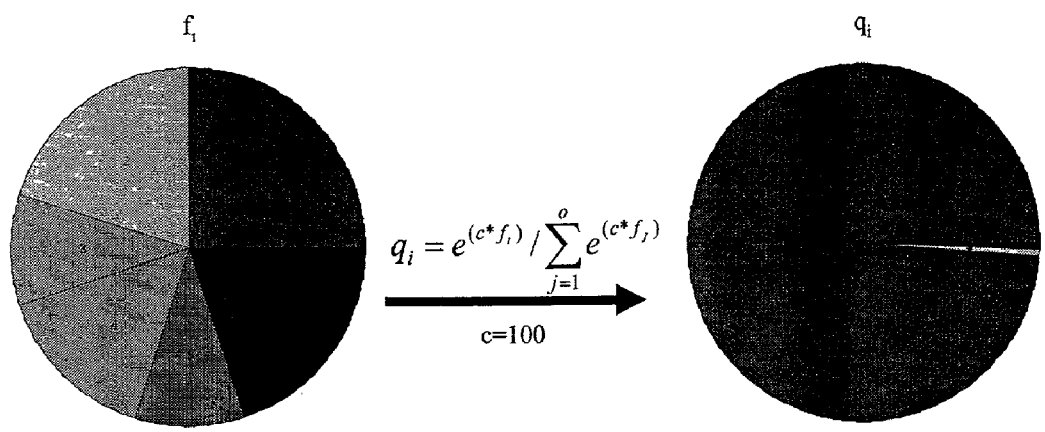
FIG. 22 is a diagram illustrating the relative attraction and probability for a walker to take a given step on a hexagonal grid based on a minimum distance weighted by pump concentration.

On the basis of the relative attraction, the walker determines the selection probability $q_j$ for each place $p_j$ in C(p). The selection probability is defined as:

$$q_i = e^{(c^* f_i)} \Big/ \sum_{j=1}^{o} e^{(c^* f_j)} \ (o = \#C(p)),$$

with a tuning parameter c that is usually very large (c>100). FIG. 22 shows the relative attraction and resulting probability of the walker on a hexagonal grid for an illustrative large tuning parameter of c=100.

Finally, the walker selects a place from the set of currently available options in a probabilistically biased decision. The probability for a place $p_j$ to be selected is $q_j$.

Performance Testing

The size of the space, specified by the number of hexagons that make up the grid, determines the density of a fixed agent population. The lower the density of a population, the smaller is the probability to encounter one of its members.

All experiments consider a regular hexagonal grid with the same number of places on the horizontal as on the vertical axis. Larger grids permit the exploration of the effects of clusters of pumps, while in smaller grids the edge may have a stronger effect. As noted previously, other polygonal grid systems and irregular grids are appreciated to be operative herein. Hexagonal grids of small, regular and large scale correspond to 10×10, 50×50 and 200×200 places, respectively.

Varying the number of pumps in a fixed grid size has the same effect as varying the grid size for a fixed number of pumps. In both cases the density of the pumps changes. Thus, it is often sufficient to vary the grid size in the specified way and maintain a consistent one pump population size.

To guard against unexpected effects of varying pump population size, it is preferred that multiple pump densities are tested. Thus, for example, for each grid size configuration a low density of 0.025 pumps/place and a high density of 0.25 pumps/place are tested. If there is a significant difference in the results for the same density configuration at different grid sizes, then this parameter should be further explored.

Walkers optionally do not interact among each other. Therefore, the number of walkers does not have any effect on the outcome of the experiments other than providing a broader statistical basis. The same statistical basis is achieved with repeated experiments with one walker with varying random seed. Thus, having multiple walkers in one experimental setup folds several experimental runs into one and saves time and resources. Normalization allows for comparison between experiments.

A pump's movement pattern has two components: the intentional movements and the random fluctuations. These movements are generated in two parallel activity cycles in the pump. The setup of an experiment specifies the configuration for each activity cycle separately. Thus, potentially all combinations of intentional movement configurations and random fluctuation configurations may be explored.

A pump's activity cycle that generates the random fluctuations has two parameters: the duration of a fluctuation and the time between two fluctuations. Thus, the following configurations are explored: no fluctuations, "short and seldom" fluctuations, "long and seldom" fluctuations, "short and often" fluctuations, and "long and often" fluctuations.

The specification of "long", "short", "seldom", and "often" is done in relation to the dynamics of the intentional movements. A long fluctuation has a duration of ¹/₁₀th of the rate of the intentional movements, while there may be 1000 successive short fluctuations between two intentional movements. A fluctuation occurs seldom, if there are 1000 intentional movements for each fluctuation. Fluctuations occur often, if there is a fluctuation for every 10 intentional movements.

In the case that there are no intentional movements, random fluctuations have to be defined in absolute terms. Then, "short" relates to 1 unit time, "long" is 100 units, "seldom" is 1000 units, and "often" is 10 units time between two fluctuations. These numbers are arbitrary and might be changed during testing.

The intentional movement pattern of a pump depends on the chosen relocation strategy and the relocation rate. The experiments collect data for three relocation strategies of no movement, random movement, and tilted movement.

The "no movement" strategy always selects the current place as the next location, and thus the pumps all remain on their initial location. In the "random movement" strategy, a pump selects its next location probabilistically, but assigns each neighboring place and its current one the same probability. The "tilted movement" strategy, on the other hand, assigns a higher selection probability to one direction.

The relocation rate determines the speed of the pumps as it specifies the (average) time between two intentional movements of a pump. The configurations explored are "high-speed pumps": 10 time units between two relocations, "fast pumps": 100 time units between two relocations, "regular pumps": 1000 time units between two relocations, and "slow pumps": 10000 time units between two relocations.

The rate of relocations of a walker is specified as the average time between two successive relocation steps. The faster a walker moves on the grid, the more often it samples the pheromone concentrations. An increase in the speed of a walker is equal to a decrease in the speed of the pumps and an increase in the stabilization time of the pheromone field.

For the first round of experiments, the rate of relocations is typically not varied. A walker pauses an arbitrary choice on average 10 units time between two successive relocations. The actual duration of the next pause is selected uniformly from the interval [8,12].

A non-random walker computes the probability for the selection of the next place out of the set of current options on the basis of the relative attraction of the selected pheromone using an amplification function. This function has one tuning parameter (c) that determines the strength of the amplification of the strongest attraction compared to the weaker ones. The larger this parameter is, the stronger is the amplification.

The tests explore the effect of three settings for the amplification parameter, namely: c=3 (no amplification), c=20 (medium amplification), and c=100 (strong approximation, approximates maximum function).

The threshold value $T_{min}$ specifies a normalized (division by 1−E) pheromone concentration, below which an entry in a distance profile is ignored. Preferably, $T_{min}$ is fixed, however it is appreciated that a dynamic threshold has applications in operation of extreme mean concentration environments.

Figure 23:
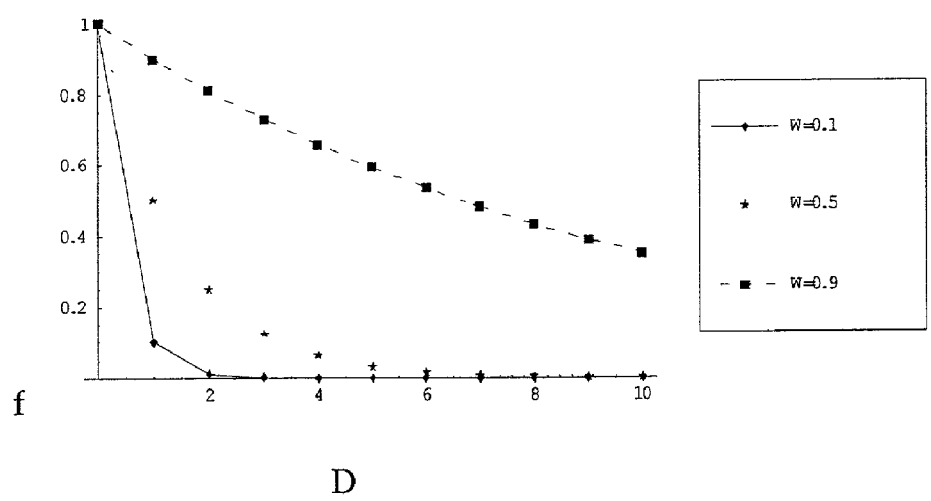
FIG. 23 is a plot of relative attraction weighting for W values as a function of distance D.

The weight in the computation of the relative attraction of a place in the set of current options of the walker's relocation strategy "minimal distance weighted by pump concentration"

determines the impact pump concentrations that are farther away have compared to those nearby. FIG. 23 shows the relative attraction weighting in a distance profile for three values of W as a function of distance.

In the same relocation strategy, the walker then augments the relative attraction, determining the selection probabilities. The augmentation function is set up to approximate the "maximum" function. Thus, the augmentation parameter is fixed to c=100.

Pump-pheromones are used to guide the spatial relocation of the walkers in the Pheromone Architecture. In the one-pheromone relocation strategy, a walker agent always follows the gradient of the same pheromone, while the multi-pheromone relocation strategy dynamically selects the pheromone in each step.

A pump-pheromone is characterized by its propagation factor F, its threshold S, and its evaporation factor E. The propagation factor and the threshold of a pheromone determine its propagation radius from the pump. The propagation radius is computed as $R_P=\ln(S)/\ln(F/6)$ for a hexagonal grid.

The experiments with walkers in the one-pheromone strategy explore the performance of the selected walker and pump populations with pump-pheromones with different propagation radii. Pheromone propagation over larger distances requires an exponentially increasing effort in communication. Typically, a radii between one and fifteen is evaluated. It is appreciated that longer range radii are operative with a course initial walker search with correspondingly slower co-location. Thus, for the case of $R_P=1,\ldots15$, pump-pheromone configurations performance data is collected:

Configuration $R_P=1$: $F=6/10, S=10^\wedge-1$

Configuration $R_P=2$: $F=6/10, S=10^\wedge-2$

Configuration $R_P=15$: $F=6/10, S=10^\wedge-15$

The experiments with walkers in the multi-pheromone relocation strategy collect data for subsets of the fifteen different pheromone configurations. The first batch of experiment varies the size of the "gap" between the propagation radii:

Configuration gap=0: $R_P=1, R_P=2,\ldots, R_P=15$

Configuration gap=1: $R_P=1, R_P=3, R_P=5,\ldots, R_P=15$

Configuration gap=2: $R_P=1, R_P=4, R_P=7,\ldots, R_P=13$

Configuration gap=14: $R_P=1, R_P=15$

Besides F and S, the pump-pheromone's evaporation factor E has to be specified for the given test. Together with the rate and strength of deposits by the pumps, the evaporation factor determines the stabilization time for a pheromone pattern.

To explore the effect of the time required for stabilization, the rate and the strength of the regular deposits is fixed and the evaporation factor only is varied. The strength of a pump's deposit is typically always one and there is a deposit every unit time. The stabilization time should be specified in relation to the setup of the pumps' intentional movements. Dynamic pump output and deposit rate are operative to correlate to activity of a latent factor.

In the case of stationary pumps or the "no movement" strategy, the pheromone pattern is stable for the whole experiment. Thus, a stabilization phase is provided before the experiment starts, or a very small evaporation factor is chosen to get a rapidly yielding stable field.

Different speeds are specified for the relocation of a pump. For each speed, there are three different stabilization times explored in the tests. To specify the time required for stabilization, a quality measure has to be given. A pheromone pattern is arbitrarily assumed to be stabilized when it has reached 99% of its fixed point value at the place of the pump. Fast, normal and slow stabilization are arbitrarily binned after 5%, 20% and 50%.

As there is currently no analytic prediction of the time required for stabilization, the correct setting for the evaporation factor E is determined experimentally.

Distance-pheromones preferably do not propagate. Their propagation factor F is fixed at zero. With a threshold larger than zero, the propagation is blocked. It is appreciated that non-zero propagation factor values have application in modeling complex behavioral systems.

The evaporation factor E of the Distance-pheromones determines the stabilization time of the distance profiles in the D-neighborhood of a pump. Again, the stabilization in relation to the relocation speed of a pump is specified in the respective experiment. Fast, normal and slow stabilization are arbitrarily binned after 5%, 20% and 50% of the relocation pause, respectively.

The only parameter in distance-agent setup that has to be varied is D, the maximum radius of the distance-agent field. This radius determines the distance from a pump up to which the pump still influences the distance profiles.

Similar to the number of pumps, the radius also depends on the size of the hexagonal grid. Three different setups are typically explored. Small, medium and large radii have 5% (50×50 grid–>radius=5% of 50=3), 20% and 50% of the grid dimensions.

Figure 24:
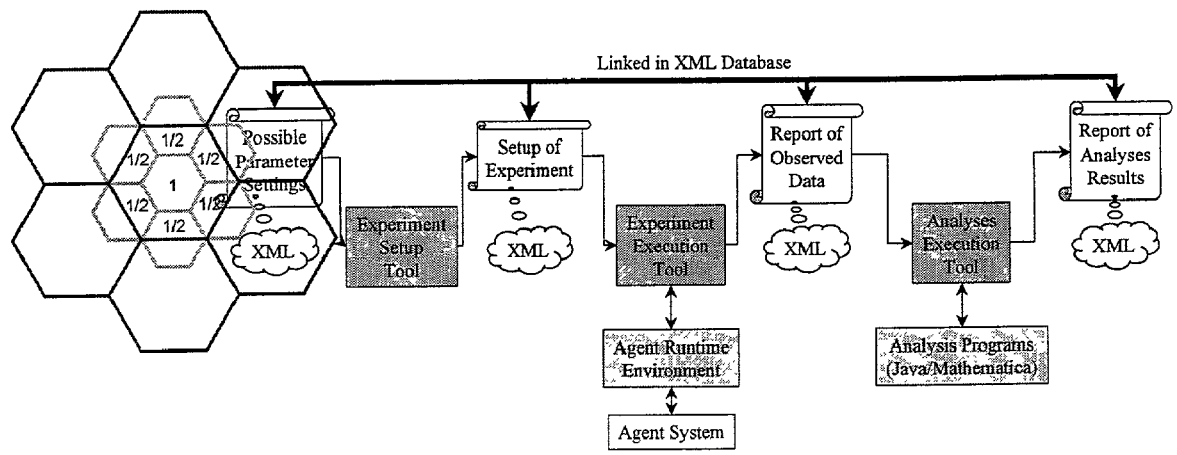
FIG. 24 is a block diagram of an inventive system test protocol.

To support automated reporting and analysis process-for the testing phase, the reports generated by the tests are recorded in XML format. A testing routine is summarized in FIG. 24.

Each relocation of a pump is recorded in the following data structure in the report of the respective experiment:

| | |
|---|---|
| Record Type: | "Pump Relocation" |
| Record Data: | |
| "Time" | time of the move (simulation time) |
| "Old Place" | start of the move (coordinate) |
| "New Place" | goal of the move (coordinate) |
| "Reason" | reason of the move ("INTENTIONAL" \| "FLUCTUATION") |

The strength of all pheromones at all places is sampled at regular intervals (parameter) in the report of the respective experiment:

| | |
|---|---|
| Record Type: | "One Pheromone Field" |
| Record Data: | |
| "Pheromone" | specification of a pheromone (type, values in data slots) |
| "Field" | list of the pheromone's concentration at all places ((coordinate, strength)*) |
| Record Type: | "All Pheromone Fields" |
| Record Data: | |
| "Time" | time of the sample (simulation time) |
| "Fields" | list of "One Pheromone Field" records ("One Pheromone Field")* |

Each relocation of a walker is recorded in the following data structures in the report of the respective experiment:

| | |
|---|---|
| Record Type: | "Walker Relocation" |
| Record Data: | |
| "Time" | time of the move (simulation time) |
| "Old Place" | start of the move (coordinate) |
| "New Place" | goal of the move (coordinate) |
| "Strategy" | relocation strategy ("RANDOM" \| ... \| "MIN_DISTANCE_WEIGHTED") |

The main performance metric applied to all tests is the co-location number of the average walker in the respective setup of the experiment. This performance value is reported for all specified configurations.

In the multi-pheromone architecture, the local guidance available at a given moment available to the walkers provides important insights. Each report of a test in this architecture preferably includes a measure of the local guidance over the run of the experiment. The average of the local guidance over the whole grid and the whole simulation time often hides too much information. A more distinct measure of the spatial entropy encoded in the local guidance pattern and its change over time is preferred.

An inventive pheromone infrastructure should provide short-range and long-range guidance. Walkers that are looking for a pheromone depositing target in an artificial landscape must be able to detect that target both far away and up close. Additionally the walker wants to receive continuing guidance on the direction to head as it nears the target location. Larger deposits of walkers can be made to disperse across ever increasing regions of the landscape, but they end up swamping out signals closer to the deposit. Thus, if a walker is using the pheromone to guide it to the target, it can begin climbing the pheromone gradient, but closer to a group of targets, it will lose all sense of direction as the pheromone fields merge into a single large plateau that provides insufficient gradient to guide further movement. Preferably, the pheromone mechanism would be able to provide guidance to a unit both far away from the target as well as nearby. Additionally, it is often desirable that some areas of the pheromone landscape have a finer mesh grid overlay as these areas are more interesting than others. This is particularly true when the artificial pheromone landscape is a representation of a real landscape. Preferably, it is desirous to have a fine-grain mesh laid over the regions of more importance or over those regions where finer control of walker movement is required. For regions where course movement or control is sufficient, a much coarser mesh is used. This requirement for differing mesh densities over the landscape is driven primarily by computing limitations. Without such limitations, one would cover the entire landscape with the finest resolution mesh required.

A multi-layer hexagonal mesh grid is provided herein to afford improved local guidance and save computational resources.

Figure 25:
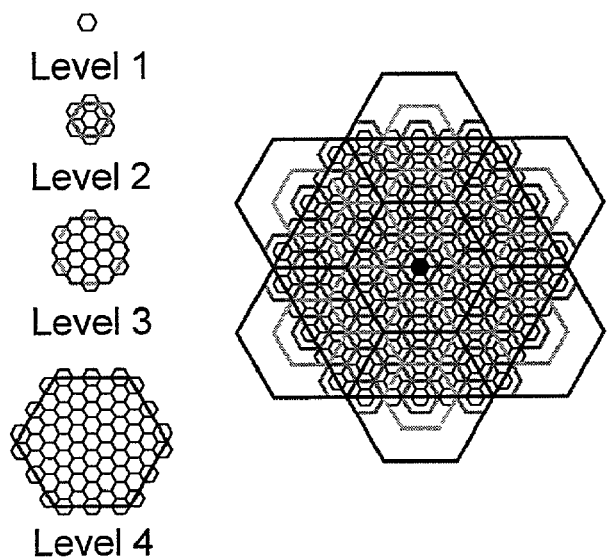
FIG. 25 is a schematic representation of a four level hexagonal mesh hierarchy of varying mesh size between levels.

Over layering different hex meshes on top of each other with different granularity in a mesh hierarchy is an operative solution. By placing layers of hex meshes with different hex element sizes together, such a scaleable hierarchy is formed. Information is distributed across each mesh layer as well as up and down the hierarchy. Different regions of the landscape are covered by different mesh densities, so that not all the meshes need to cover the same space. FIG. 25 shows how different hexagonal meshes of varying sizes can be overlaid on top of each other. Note that there is no way to overlay a larger hex mesh over a smaller hex mesh that completely encloses a set of the smaller mesh elements. In rectangular and triangular meshes, it is possible to have complete closure.

Level 1 (the black mesh) shows a hex mesh at the finest level of detail. Level 2 (the gray mesh) is the next coarser mesh size that can be overlaid on Level 1. It completely encloses the central hex element as well as ½ of each of its 6 neighbors. The area of a single Level 2 hex element is four times the area of a Level 1 element. This hierarchy is called a 4× hierarchy referring to the change in area between adjacent levels.

Figure 26:
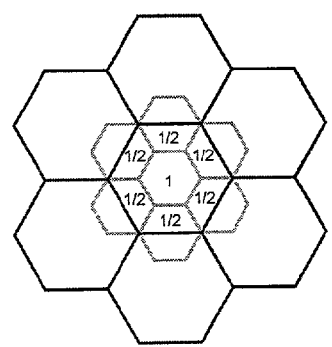
FIG. 26 is an expanded schematic of the relationship between the level 3 and level 4 meshes of FIG. 25.

FIG. 26 shows the detailed relationship between Level 3 and Level 4 hex meshes. This relationship holds true for any two adjacent levels in the hex mesh hierarchy. Each coarser level hex mesh is four times the area of the finer level and encloses one complete element and ½ of each of its six neighbors.

The side figures for Level 3 and Level 4 in FIG. 25 shows how the hex meshes overlay non-adjacent levels in the hierarchy. A Level 3 mesh element is noted to enclose 13 complete hex elements from Level 1 and ½ of each of the six on-axis neighbors of the central group of seven. The on-axis neighbors are those hex elements on one of the six axes that radiate from the center hex element out through the centers of each of its six neighbors.

Level 4 encloses 55 complete hex elements and 18 half hex elements. The formulas that describe these relationships are well known to the art.

Figure 27:
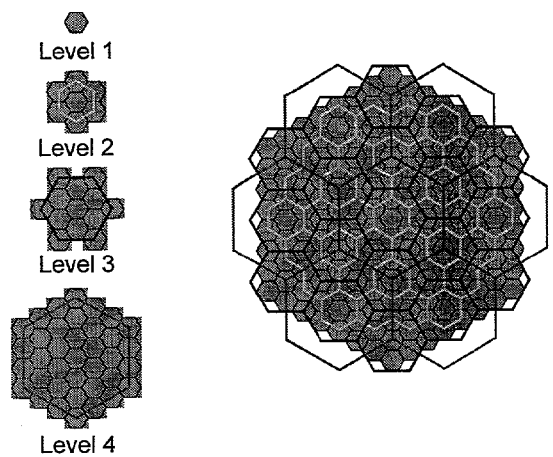
FIG. 27 is an alternate mesh hierarchy with a different intergrid orientation compared to FIG. 25.
Figure 28:
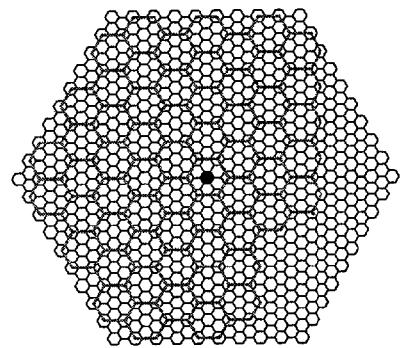
FIG. 28 is still another alternate mesh hierarchy with a different intergrid orientation compared to FIG. 25.

It is appreciated that there are alternative ways to build hex mesh layers. By changing the orientation between layers hierarchies are built that differ in area by three times rather than four times as shown in FIG. 27. Each level is rotated 30° from the previous level. Hex element membership can be whole, half or ⅓. FIG. 28 shows a hierarchy that differs in area by a factor of nine between levels without requiring a change in orientation. This is essentially every odd level of the 3× mesh hierarchy. Either by skipping levels in the hierarchy, or by building hierarchies with different size steps between levels one selects the optimal configuration for a particular set of requirements. More generally, it will be apparent to one skilled in the art that this multi-level approach can readily be extended to irregular grids of different densities, without going beyond the invention herein claimed.

In a multi-level meshed landscape, a pheromone propagates at only one level. Say a pheromone pump is placed at the center level 3 hex element in FIG. 25. The pheromone would propagate to the six gold-level hex neighbors and on throughout the rest of level 3 according to the rules of pheromone propagation. This would occur independent of any other levels that might exist in the mesh hierarchy. A pheromone can propagate on only a single level, but it can be read at any other level.

Because each level has different size hex meshes, pheromones propagate at different speeds and distances on each level. By placing pheromone pumps at multiple levels that represent the same unit, information about that unit can be propagated quickly over long distances to other units far away while still providing guidance to units nearby. With a 4× hierarchy pheromones of the same deposit rate, size, and propagation factors propagate twice as fast and twice as far as the next lower layer in the hierarchy. Four levels in the hierarchy can provide guidance over eight times the radius of a single level.

The multi-level hierarchy aids in the efficiency of information propagation as well. Pheromones can be made to propagate over different distance by adjusting parameters such as the propagation and evaporation factors. But information must still propagate a hex element at a time. With a multi-level hex mesh, the information propagation must pass through fewer hex elements (and therefore requires fewer computations) to reach the same distance as a pheromone at a lower level in the hierarchy.

Propagation speed can be varied by changing the update frequency of a pheromone for a single-level hex mesh. But in a multi-level hex mesh, the speed of propagation is faster in the upper levels without having to increase the propagation frequency (and hence computational load).

Though pheromones propagate at a single level, information about a pheromone needs to be available at other levels in the hierarchy. Information is rolled up and distributed down the levels.

Figure 29:
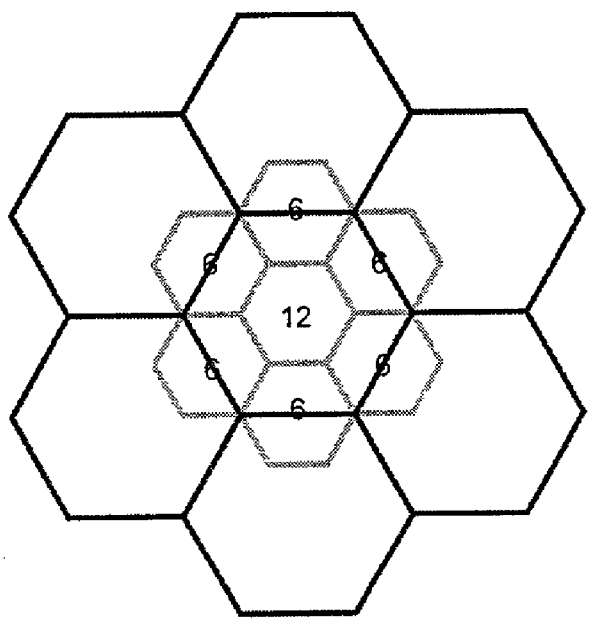
FIG. 29 is a schematic illustrating rolling of pheromone levels upward to an overlaying level.
Figure 30:
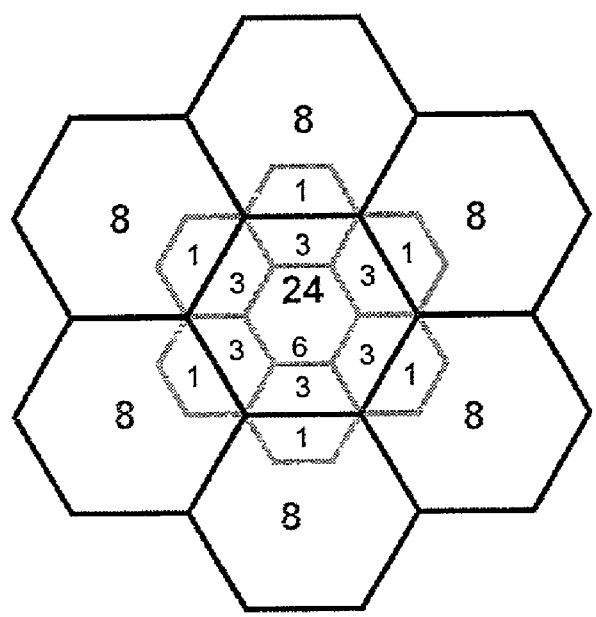
FIG. 30 is a schematic illustrating rolling of pheromone levels downward to an underlying level.

To roll-up information from the lower level, pheromone strengths are added together from whole and fractional hex places enclosed by the higher-level hex place. FIG. 29 shows how pheromones from level 3 can be rolled up to level 4. FIG. 30 shows how information from level 4 can be rolled down to level 3. This mechanism for distributing information between levels in a hierarchy can be invoked recursively so that a pheromone propagating at any level in the hierarchy can be sensed as a pheromone strength in a hex element at any other level in the hierarchy. The actual roll-up or roll-down preferably only is done on request to reduce the amount of information that moves up and down the hierarchy.

Units of pumps, agents or walkers can move on the hex mesh. They utilize information present in the hex mesh illustratively including random walk and pheromone strengths to make decisions about where to move in the mesh. When there are multiple levels in the hex mesh, the units must decide which information to read, how to interpret the information, and which level in the hierarchy to use for movement.

Figure 31:
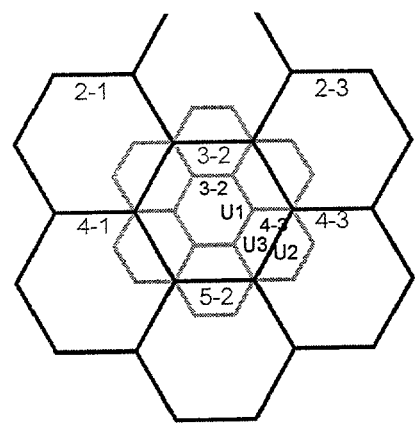
FIG. 31 is a schematic illustrating unit placement in a multi-layer hierarchy.

Units belong to single hex element at each level in a multi-level hierarchy. Units always maintain an absolute location which determines their hex element membership at each level. In FIG. 31 U1 is a member of level 4 and level 3 hex elements labeled "3-2". U2 is a member of level 4 and level 3 hex elements labeled "4-3". U3 is a member of the level 4 hex element, "3-2" and the level 3 hex element "4-3".

When a unit needs to move, it will typically sense the pheromone strengths at its current place and in the six neighbors of its current hex element. In a multi-level hex mesh, the unit has two options. It can have the information about the pheromones it is interested in rolled-up or down to a single level of the hierarchy where it will make its decision. It then proceeds to decide and move as if those pheromones had all propagated on a single level hex mesh.

Alternatively, the unit could sense the pheromones of interest at each level from the perspective of the place that it is a member of. In this mode, the unit would determine the lowest level that provides the highest guidance, use that level for making a movement decision, and then move to the next hex element at that level. An example will help to explore this second option.

Figure 32:
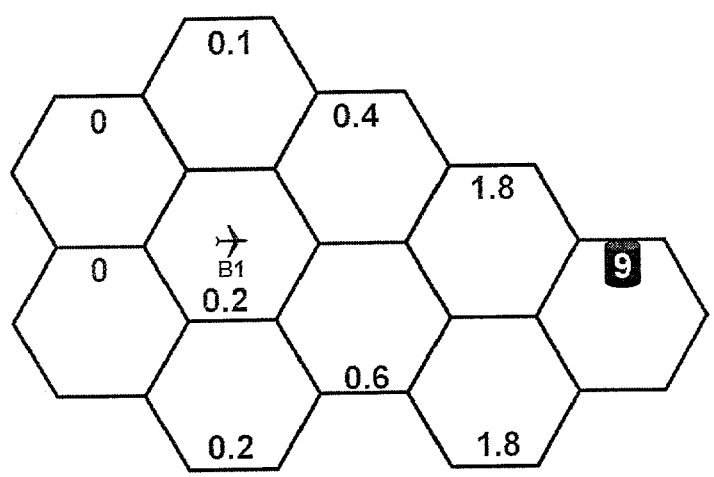
FIG. 32 is a schematic of a black level grid and the pheromone concentration a unit senses thereon.
Figure 33:
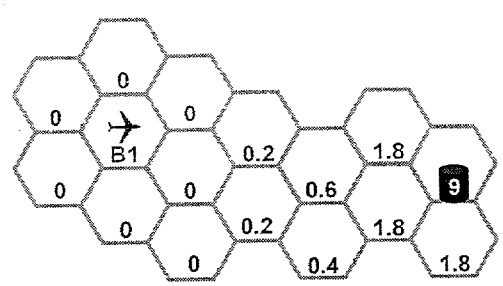
FIG. 33 is a schematic of a gray level grid and the pheromone concentration a unit senses on this underlying grid to that shown in FIG. 32.

By way of example, unit B1 is moving over a multi-level hex mesh. It is attracted to purple pheromone and repelled by red pheromone. There is a purple pump located at the far right of the mesh. A pump has been placed on the black and the gray level to provide near and far guidance to the units. As shown in FIG. 32 unit B1 senses the purple pheromone on the black level from the pump at the far right hex in the mesh. It can calculate a guidance figure that it receives for the purple pheromone on the blue level by the normal formulas (0.4=0.6/1.5). Unit B1 can also sense the purple pheromone on the gray level 3 of FIG. 33. At its current location, there is no purple pheromone in any of the surrounding cells because the purple pheromone did not propagate that far on the gray level. The guidance for the purple pheromone on the gray level is 0. If Unit B1 only decided its movement based on purple pheromone, it would use the pheromone strengths sensed at the black level using the level with the highest guidance, decide which black hex element to move to and then move to that black hex element.

Figure 34:
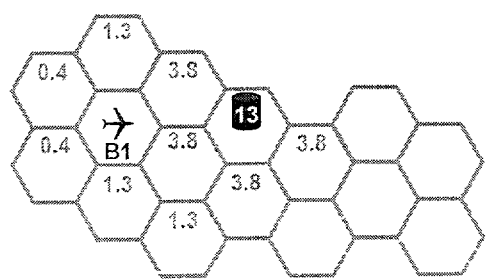
FIG. 34 is a schematic of a gray level red avoidance pump having only a limited range and therefore well suited to a single level pheromone propagation.

In FIG. 34 a red pump has been placed on the gray level towards the middle of the mesh. The pump is only placed on level 3 since units only need to worry about avoiding the red pump when they are close to it. Thus, long distance guidance is not a requirement so a single pump at the gray level will suffice.

Unit B1 senses the red pheromone on the gray level which is the only level that provides red pheromone guidance. Unit B1 must now make a decision on where to move next. It will decide to either stay or move in one of the six directions based on the strength of red pheromone from the gray level and purple pheromone from the black level. Once it decides which direction to move in, it will move on the gray level, the lowest level among all the levels used in the decision. Depending on how strongly it is repelled by red, it may decide to move due South, where red is only 1.3 in strength, but purple is only 0.2, the same as its current location, or it may decide to move in a Southeasterly direction where purple pheromone strength is 0.6, the greatest of its neighbors, but red is 3.8, also the greatest of its neighbors. As long as Unit B1 is in the vicinity of the red pump pheromones, it will continue to move on the gray level.

As B1 moves closer to the purple pump, it will eventually begin to sense purple pheromone on the gray level. At that point, it will use the level that provides the greatest guidance to make a decision. If there are other purple pumps in the area, then the pumps at the gray level will provide better guidance up close. Even without those extra pumps, Unit B1 might want to switch to the gray level once it gets near to move to the hex element whose location is closest to the actual position of the unit represented by the pump. The black level only provides a course location for the unit.

Figure 35:
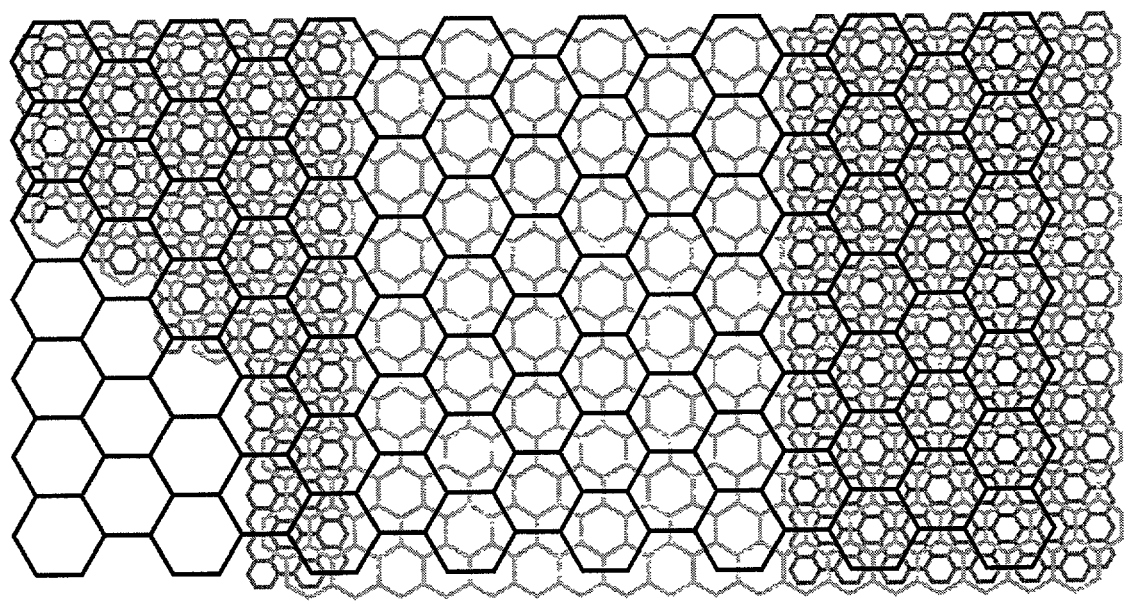
FIG. 35 is a schematic showing non-overlapping grid meshes.

A desirable feature of the inventive mesh is the ability to provide different levels of granularity over different regions of interest. For example, modeling troop movement over land, little resolution is needed over a mountainous region or over the ocean. However, a much finer mesh is desirable over key cities and potential targets. This is accomplished with a multi-level mesh hierarchy by allowing non-overlapping regions across the levels. FIG. 35 shows a 3×mesh hierarchy where the dark gray and gray levels do not cover the entire space. In order to ensure that information is available across the entire surface or that movement is capable across the entire landscape, the courser levels cover the union of the areas of all the finer levels in the hierarchy. If this rule is maintained, then pheromone propagation at that level can guide units across portions of the landscape not covered by certain lower levels in the mesh hierarchy.

By way of example, the aforementioned elements are integrated as detailed herein to form a self-organizing pheromone infrastructure. This system is described with reference to battleground surveillance, but it is appreciated that search and rescue, fishery migration, and pollution monitoring are other illustrative uses of the instant invention.

A high flying plane drops a large number of processing nodes ("places") on a battlefield. The places scatter randomly and burrow into the ground. Once they have established their respective position (GPS), they start to interact by wireless short-range communication with nearby places. At any time, processing nodes may be lost through failure or enemy action or new nodes are added. The places are able to detect and identify targets and seekers in their surroundings through sensors and direct communication with mobile seekers. In response to the current spatial distribution of targets and seekers, the places self-organize in a layered information infrastructure.

A place in the infrastructure emits a continuous signal that transmits the place's coordinates, its current radius of responsibility, and the number of targets with optional specification of different flavors inside this radius. This signal is caught by nearby seekers and guides them to their targets.

The radius of responsibility of a place specifies the current area around the position of the place for which information is communicated. It is not necessarily the maximum range of the place's sensors.

In the self-organization process, the single places shrink or expand their respective responsibility radius with the global goals of maximizing the number of places inside whose radius a seeker is located, and maximizing the variance of radii a seeker is located in. These goals are orthogonal and constrained by the maximum radius of the place's sensors and communication. For any distribution of seekers there should be one or more local optima. The location of these optima changes with the changing distribution of seekers and places.

Targets are either identified by the sensors of the places or by mobile reconnaissance units such as drones. It is necessary for a place to estimate the distance of a target from its own location. Each place keeps a list of these targets and their distance in its memory and transmits the number of targets that are inside its current responsibility radius.

A seeker is a physical mobile agent on the battlefield whose task it is to approach the targets. The seeker knows its current position (GPS) and it is able to receive the signal sent out by nearby places.

As a consequence of the self-organization of the information infrastructure, a seeker should be inside the responsibility radius of some of the nearby places. It is going to ignore the signal of all other places.

While the seeker is not able to perceive its targets directly, it accepts the guidance through the information infrastructure. On the basis of the received signal, a seeker continuously re-computes its current heading while it moves through the field. Its current direction is guided by the sum of the vectors of attraction of the currently relevant places. This sum is called the current guidance vector.

The vector of attraction of a place points from the seeker's current position to the position of the place. The guidance vector length depends on factors illustratively including: the current distance to the place, that is the closer a seeker is to the center of a place, ratio between distance and responsibility radius, the shorter is the vector; the current radius of responsibility of the place, that is the wider the radius of a place, the shorter the vector; and the current number of targets inside the radius of responsibility, with the higher the number of targets, the longer the vector.

A seeker adds to the guidance vector a fixed-length vector of random direction. Thus, it will tend to walk randomly for short guidance vectors. For longer guidance vectors the seekers tendency to accept the direction grows. It is appreciated that the center guidance vector length of a seeker is optionally fed back into the infrastructure to provide additional information to the infrastructure such as estimating contact time between a seeker and a target.

An undirected communication system is also readily formed according to the present invention. Thus, a series of undirected short range communications between spatial distributing limited ability sensors allows global information flow through the system. A simple enhancement of the interaction mechanisms permits the approximation of the absolute geographic location by each entity.

A collection of many small robots ("s-bots") are distributed over a physical 2D or 3D space. The s-bots illustratively are sensors monitoring the environment. For the purpose of this example, it is not relevant whether these s-bots are capable of physical movement or not. But each s-bot is able to exchange messages with neighbors, using, for instance, radio, sonar, or infra-red communication. These communication capabilities are limited in being short range. There is a fixed radius R beyond which an s-bot cannot send or receive messages, regardless of whether R is hard or soft. The critical issue is that the communication range of an individual s-bot is much shorter than the distance over which information generated by an s-bot needs to travel. The communication is also undirected. All robots inside the radius R receive a message sent by an s-bot. In this example, messages cannot be addressed to an individual s-bot alone.

Inside the collection of s-bots there are a few relative to the number of s-bots, larger robots, termed Anchors. In the communication between an Anchor and an s-bot, the same restrictions apply. Anchors optionally are able to communicate long-range to other entities outside of the robot collection, but this long-range communication capability cannot be used between Anchors and s-bots.

This invention enables two important system-level behaviors to emerge under these very restrictive communication conditions. First, the system produces a directed information flow from the s-bots to the Anchors by, for example, relaying sensory information for more central processing, even if the Anchor itself is outside of the communication range of the s-bot. Second, an s-bot can estimate its absolute geographic location. The underlying mechanism is the construction of one or more potential fields across the s-bots. The gradient of this field guides messages toward the Anchors. This gradient is termed a Guidance Field.

The Guidance Field is a collection of scalar values located at the s-bots. It guides the flow of information among the s-bots and the Anchors.

Each s-bot b carries an internal variable g that contains a real valued number, which changes over time ($g_h(t) \in R$). The initial value of g is zero. The variable g reflects the s-bot's distance from an Anchor.

All s-bots share three global parameters that influence the change of the variable g. E ($E \in (0,1)$) defines the rate at which g evaporates over time, thus discarding obsolete distance information. F ($F \in (0,1)$) defines how strongly g is forwarded or propagated to adjacent s-bots. S ($S>0$) is a threshold below which g should not be propagated further.

s-bots exchange propagateG(uidance) messages that carry a real valued number q. An s-bot executes behavior to support creation of the Guidance Field to continuously reduce the absolute value of g over time: $g_h(t)=g_h(t-1)*E$, and add the value q that is received in a propagateG message to the current value of g and then, if $q*F>S$, broadcast a propagateG message with an attached value of $q*F$. Because of the short range and undirected nature of the communications, this message will reach only nearby s-bots and Anchors.

Anchors do not carry a g value, but they send propagateG messages to the nearby s-bots. All Anchors share two global parameters Ta (Ta>0) and A (A>0). Each Anchor executes the following behavior in the creation of the Guidance Field:

At regular intervals Ta, send out a propagateG message with an attached value of A.

A propagateG message from an Anchor increases the local value of g of all s-bots in the Anchor's direct neighborhood by a value of A. All the s-bots that receive the message from the Anchor send out their own propagateG message with a value of $A*F<A$.

This second message reaches s-bots that are outside of the Anchor's direct communication range and it triggers further messages with even smaller attached values until finally the attached value falls below the global threshold S and the propagation stops.

Thus, in general, the increase in the s-bots' internal g value resulting from all propagateG messages that are triggered by the same initial message from the Anchor decreases with growing distance from the Anchor.

The Anchor repeats its generation of propagateG messages at regular intervals Ta, which results in a repeated increase of the local g values in the s-bots. At the same time, the s-bots decrease the absolute value their local g variables proportional to their current value. A simple limit-value calculation (S. Brueckner. *Return from the Ant: Synthetic Ecosystems for Manufacturing Control*. Dr.rer.nat. Thesis at Humboldt University Berlin, Department of Computer Science, 2000) shows that these two processes stabilize the local g values around a fixed point.

The location of the fixed point depends on the distance of the respective s-bot from the Anchor, as well as the particular spatial distribution of the s-bots. In general, s-bots farther away from the Anchor will stabilize their g variables on a value smaller than those closer to the Anchor. As a consequence, Anchors are found near the s-bots with the locally maximum g values.

The alignment of Anchors with the local maxima in the g field holds even when the s-bots or Anchors change their location over time, as long as the dynamics of the movements are slow compared to the stabilization of the Guidance Field, which depends on A, E, and Ta. S. Brueckner. *Return from the Ant: Synthetic Ecosystems for Manufacturing Control*. Dr.rer.nat. Thesis at Humboldt University Berlin, Department of Computer Science, 2000.

s-bots have to transmit information to Anchors, for instance, if the sensors of an s-bot report a significant change in its local environment. But, because of the restricted communication capabilities, that information has to be relayed to the Anchors, without knowing the location of the Anchors.

The Guidance Field directs the propagation of messages from the s-bot source to the nearest Anchor.

The s-bot that is the source of the information flow includes the data that it wishes to send to the Anchor in a propagateD (ata) message. In addition to the data, the message carries the following values: id uniquely identifies the included data package, g gives the value of g at the last sender of the message at the time the message was created, pCnt counts the number of times the message has been held at the current s-bot, and hCnt counts the number of times the message has been passed on since its data was created.

The s-bot sets the g value of the message to its own current g value and it sets pCnt and hCnt to zero. Then it broadcasts the message.

All s-bots share three global parameters that influence message propagation. pCntMax (pCntMax>0) determines how many times an s-bot may evaluate a message for retransmission before discarding it. Multiple evaluations smooth out temporary disruptions in the gradient field, and also permit mobile s-bots to carry messages with them as they move. hCntMax (hCntMax>0, hCntMax>>pCntMax) limits how many times a message may be retransmitted, thus defining the maximum transmission distance. Ts (Ts>0) defines how frequently an s-bot evaluates and retransmits messages.

Any s-bot that receives a propagated message stores it in its internal message management module if hCnt<hCntMax. Otherwise it ignores the message. At regular intervals of Ts the message management module applies rules to each of its stored messages. If the attached g value is smaller than the local g value, then the current s-bot is closer to an Anchor than the s-bot from which it received the message, and it should pass the message on, by the steps of: setting the g value of the message to the value of the local one, setting pCnt of the message to zero, increasing hCnt of the message by one, sending the thus modified message to the neighboring s-bots, and removing the message from the management module.

If the attached g value is equal to or larger than the local g value of the s-bot, then the message came from an s-bot at least as close to an Anchor than the current s-bot, and the current s-bot should not rebroadcast it, but update its age to increase pCnt of the message by one, and if pCnt>pCntMax, then it removes the message from the management module.

The motivation for holding a message for pCntMax time steps is twofold. First, there may be short-term irregularities in the guidance field, and this delay permits time for them to settle out. Second, the s-bot may move closer to an Anchor while it is carrying the message, and later find that it would be effective to rebroadcast. Thus, messages travel either by transmission between s-bots, or through the physical movement of the s-bots themselves.

Each Anchor receives all propagateD messages sent by its local s-bot neighbors. If a message carries an id value that has been received already in a previous communication, then the Anchor ignores the message. Otherwise, it extracts the data package and processes the information.

Each individual s-bot broadcasts the propagateD message to all its neighbors in any direction. A directed information flow between the source s-bot and an Anchor only emerges from the interaction with the Guidance Field represented in the local g-values.

The propagation of messages follows the gradient of the Guidance Field. Messages that have been sent in any other direction are discarded after a short (pCntMax) period. Larger pCntMax parameter values allow the system to handle short-term disturbances in the Guidance Field at the cost of increased resource requirements at the message management module.

The Anchors are located at the local maxima of the Guidance Field and propagateD messages climb the gradient of this field. Thus, a directed message flow from the original s-bot towards the nearest Anchor emerges. If the s-bot is approximately equidistant to multiple Anchors, the flow may split and reach more than one.

The distance over which messages are passed is restricted by the global parameter hCntMax. The propagation of a message stops if it is stuck in a local maximum such as near the Anchor, or if it has been passed up the gradient too many times. It is important in the tuning of the mechanism to ensure that the hCntMax parameter is not too restrictive. In dynamic environments the hCntMax parameter should be adapted automatically, using an evolutionary strategy that balances the communication load against the transmission quality.

s-bots are simple robots without the ability to directly sense their geographic location such as through GPS. A simple extension of the mechanism that creates the Guidance Field permits the s-bots to approximate their location.

In an approximately homogeneous distribution of s-bots over space and with only one Anchor in the system, all s-bots that are at the same distance from the Anchor share approximately the same stabilized value of g. The Guidance Field is symmetrically centered on the Anchor.

In the Extended Guidance Field, each s-bot manages a vector G of numerical values instead of just one value g. The vector has as many elements as there are Anchors in the system. The s-bot applies the previously specified behavior to all elements of G and a propagateG message carries an additional identifier of the G-element, to which its attached value q should be added. Each Anchor's propagateG messages include this unique identifier, corresponding to its unique element in the G vectors of the s-bots.

The Extended Guidance Field has a component for each Anchor. Once stabilized, the field that is created by the element of the G vector that is uniquely assigned to the Anchor has only one maximum, which is then symmetrically centered on the location of the Anchor.

An s-bot may use its local G vector to determine its location relative to all Anchors in the system (triangulation). Given that there is a sufficient number of Anchors (3 non-colinear Anchors in 2-D space, 4 non-coplanar and non-colinear Anchors in 3-D space), each s-bot will have a unique combination of values in G.

Anchors are more complex entities, which are able to determine their absolute geographic location. If they include this information in each propagateG message, then the s-bots can not only determine their relative position, but also approximate their absolute geographic position.

Patent applications and publications mentioned in the specification are indicative of the levels of those skilled in the art to which the invention pertains. These applications and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A system for constraining the movement of a walker in a digital space with respect to some distinguished location in said space, comprising:
   a pump software component associated with the distinguished location emitting a digital pheromone to generate a pheromone gradient, said pheromone having a rate of evaporation and a rate of propagation and
   a walker software component operating in a grid system within the space and having a pheromone sensing threshold, said walker moving within the space to satisfy a preselected constraint with respect to said pump.

2. The system of claim 1 wherein the space is two-dimensional.

3. The system of claim 1 wherein the space is selected from the group consisting of: virtual, three-dimensional and multi-dimensional with a dimensionality of greater than 3.

4. The system of claim 1 further comprising a plurality of said pumps.

5. The system of claim 1 wherein said pheromone is emitted at a fixed strength.

6. The system of claim 1 wherein said pheromone is emitted at regular intervals.

7. The system of claim 1 wherein said pump is stationary.

8. The system of claim 1 wherein said pump is mobile within the space.

9. The system of claim 1 wherein the rate of propagation is the same in all directions.

10. The system of claim 1 wherein the rate of propagation depends on a mesh of the grid system.

11. The system of claim 1 wherein the propagation is between 1 and 20 walker sensing steps.

12. The system of claim 1 wherein said grid system is selected from a group consisting of: trigonal, quadragonal, irregular, and hexagonal.

13. The system of claim 1 wherein the grid system is hexagonal.

14. The system of claim 1 wherein the preselected constraint relative to said pump is co-location.

15. The system of claim 1 wherein the preselected constraint relative to said pump is a spacing having a preselected pheromone concentration.

16. The system of claim 15 wherein the preselected pheromone concentration is above the pheromone sensing threshold of said walker.

17. The system of claim 15 wherein the preselected pheromone concentration is below the pheromone sensing threshold of said walker.

18. The system of claim 1 wherein said pump emits a plurality of pheromones, said plurality of pheromones having a plurality of rates of propagation and said walker senses each of said plurality of pheromones differently.

19. The system of claim 1 wherein said grid system is a multi-layer grid system.

20. The system of claim 19 wherein the multi-layer grid system comprises layers that vary in relative mesh.

21. A process for constraining the movement of a walker software component in a digital space with respect to some distinguished location in said space, comprising the steps of:
   emitting a digital pheromone from a pump to generate a pheromone gradient, wherein said pheromone has a rate of evaporation and rate of propagation; and
   moving said walker within the space in response to the pheromone gradient to satisfy a preselected constraint relative to said pump.

22. The process of claim 21 wherein the movement of said walker follows a polytopal grid system.

23. The process of claim 22 wherein the grid system is selected from a group consisting of trigonal, quadragonal, irregular, and hexagonal.

24. The process of claim 23 wherein the grid system is hexagonal and a sum of said pheromone deposited in a grid system place that is reached from the pump's place $p_0$ in d steps and the shortest path of the grid system, t time units after emission is computed recursively as $$q(d, t) = \frac{F}{6}\left(\begin{array}{c} \frac{2d-1}{d-1}q(d-1, t-1) + \\ 2q(d, t-1) + \\ \frac{2d+1}{d+1}q(d+1, t-1) \end{array}\right)$$

where F relates to the strength of the pheromone emission.

25. The process of claim 21 wherein the movement of said walker further comprises the step of determining a selection probability for moving a grid system unit adjacent to a walker place.

26. The process of claim 25 wherein determining the selection probability further comprises the steps of:
   sampling a concentration of said pheromone, $s_i$ at each adjacent place $p_i$; and
   determining the relative attraction, $f_i$ of an adjacent place normalized by an overall concentration of all places as given by the equation $$f_i = s_i \bigg/ \sum_{p_j \in C(p)} s_j$$

where C(p) is the current place of said walker and the directly adjacent grid system units of said walker and $j$ denotes all grid system units sampled.

27. The process of claim 21 wherein emission of a pheromone further comprises emitting a second pheromone having a second propagation distance that varies from the propagation distance of said pheromone.

28. The process of claim 21 wherein the preselected location of said walker relative to said pump is co-location.

29. The process of claim 21 wherein emission of said pheromone is from a plurality of pumps within the space.

30. The process of claim 21 wherein movement of said walker in the space is random until said walker senses said pheromone gradient.

31. The process of claim 27 wherein the movement of said walker is along a multi-layer grid system.

32. The process of claim 31 wherein said second pheromone is emitted differentially within the multi-layer grid system relative to said pheromone.

33. The process of claim 31 further comprising the step of said walker following said second pheromone preferentially when remote from said pump and said pheromone preferentially when proximal to said pump.

34. A system for constraining the movement of a walker software component in a digital space with respect to some distinguished location in said space, comprising:

a pump software component;

a plurality of distance software agents created by said pump around a pump location, said plurality of distance agents depositing distance-pheromones having local concentrations forming a distance profile; and a walker software component operating in a grid space of polytopes that samples the distance profiles to satisfy a preselected constraint relative to said pump.

35. The system of claim 34 wherein the space is two-dimensional.

36. The system of claim 34 wherein the space is selected from the group consisting of: virtual, three-dimensional and multi-dimensional with a dimensionality of greater than 3.

37. The system of claim 34 further comprising a plurality of said pumps.

38. The system of claim 34 wherein said pump is mobile within the space.

39. The system of claim 34 wherein the preselected constraint relative to said pump is co-location.

40. The system of claim 34 wherein said polygonal grid system is a multi-layer grid system.

* * * * *